United States Patent
Atarashi et al.

(10) Patent No.: US 6,666,991 B1
(45) Date of Patent: Dec. 23, 2003

(54) FLUORESCENT OR PHOSPHORESCENT COMPOSITION

(75) Inventors: Takafumi Atarashi, Tokyo (JP); Kiyoshi Hoshino, Tokyo (JP); Katsuto Nakatsuka, 3-5-1403, Moniwadai 4-chome, Taihaku-ku, Sendai-shi, Miyagi 982-0252 (JP)

(73) Assignees: Nittetsu Mining Co., Ltd., Tokyo (JP); Katsuto Nakatsuka, Miyagi (JP)

( * ) Notice: Subject to any disclaimer, the term of this patent is extended or adjusted under 35 U.S.C. 154(b) by 0 days.

(21) Appl. No.: 09/856,947

(22) PCT Filed: Nov. 25, 1999

(86) PCT No.: PCT/JP99/06587

§ 371 (c)(1),
(2), (4) Date: May 29, 2001

(87) PCT Pub. No.: WO00/32716

PCT Pub. Date: Jun. 8, 2000

(30) Foreign Application Priority Data

| Nov. 27, 1998 | (JP) | 10-337735 |
| Dec. 16, 1998 | (JP) | 10-357806 |
| Dec. 16, 1998 | (JP) | 10-357807 |
| Dec. 24, 1998 | (JP) | 10-367621 |

(51) Int. Cl.$^7$ ............... C09K 11/02; C09K 11/08; B41M 3/14; B41M 5/26; G03G 9/09
(52) U.S. Cl. ............... 252/301.4 R; 252/301.4 S; 252/301.4 R; 252/301.4 P; 252/301.4 H; 252/301.5; 252/301.6 R; 252/301.6 F; 252/301.6 S; 252/301.6 P; 252/62.51 R; 252/62.55; 252/62.56; 252/62.57; 252/62.58; 252/62.59; 252/62.6; 252/62.61; 252/62.62; 252/62.63; 252/62.64; 252/500; 106/400; 428/490; 283/73; 283/82; 283/85

(58) Field of Search ............... 252/301.4 R, 301.4 P, 252/301.4 F, 301.4 H, 301.45, 301.5, 301.6 R, 301.65, 301.6 F, 301.6 P, 301.36, 62.51 R, 62.52, 62.53, 62.54, 62.56, 62.57, 62.58, 62.59, 62.6, 62.61, 62.62, 62.63, 62.64, 500; 106/31.64, 415, 416; 428/416, 690; 283/73, 82, 85

(56) References Cited

U.S. PATENT DOCUMENTS

| 5,431,851 | A | * | 7/1995 | Karam et al. | 252/301.4 R |
| 5,667,724 | A | * | 9/1997 | Petersen | 252/301.6 R |
| 5,672,200 | A | * | 9/1997 | Heinz et al. | 106/403 |
| 6,210,777 | B1 | * | 4/2001 | Vermeulen et al. | 428/195 |
| 6,310,118 | B1 | * | 10/2001 | Atarashi et al. | 523/205 |
| 2002/0160194 | A1 | * | 10/2002 | Phillips et al. | 428/403 |

FOREIGN PATENT DOCUMENTS

| EP | 0 338 368 A1 | | 10/1989 |
| EP | 0 549 327 A2 | | 6/1993 |
| JP | 53-14184 | | 2/1978 |
| JP | 56-161490 | | 12/1981 |
| JP | 6-287466 | | 10/1994 |
| JP | 6-290327 | | 10/1994 |
| JP | 11-185097 | | 7/1999 |
| JP | 11-272907 | | 10/1999 |
| RU | 2112958 | | 6/1998 |
| WO | 98/07792 | | 2/1998 |
| WO | WO 01/60924 | * | 8/2001 |
| WO | WO 02/40599 | * | 5/2002 |

* cited by examiner

Primary Examiner—C. Melissa Koslow
(74) Attorney, Agent, or Firm—Sughrue Mion, PLLC (57) ABSTRACT

A fluorescent or luminous composition, comprising a multilayered film-coated powder having at least two coating films on a base particle, and a fluorescent or luminous substance; the composition, wherein at least one layer of the coating films contains the fluorescent or luminous substance; a genuine/counterfeit discrimination object, in which the fluorescent or luminous composition; and a genuine/counterfeit discrimination method, comprising recognizing fluorescence or luminescence by irradiating, with a light, the genuine/counterfeit discrimination object.

9 Claims, 4 Drawing Sheets

FLUORESCENT OR PHOSPHORESCENT COMPOSITION

TECHNICAL FIELD

The present invention relates to a fluorescent or luminous composition. More particularly, the present invention relates to a fluorescent or luminous composition having both of color and fluorescence or luminescence, which is useful for preventing counterfeit when it is formulated to an ink, a filler, and a toner for printing or coating.

BACKGROUND ART

It is known that coating of powder surface with a film of other substance improves the quality of the powder or imparts multiplicity to the quality, and a variety of methods for achieving the purposes have been hitherto proposed.

Examples of known coating techniques of forming films on substrate surfaces for their protection or decoration include many methods, such as a coating method, a precipitating method, a sputtering, a vacuum deposition method, an electrodeposition method, and an anodic oxidation method. However, it is difficult to have a uniform thickness by the coating method or precipitating method, and it is also difficult to obtain a thick film by the sputtering or vacuum deposition method. Furthermore, the electrodeposition method and the anodic oxidation method possess a problem that these methods are difficult to apply to the treatment of powder because they use a substrate to be treated as an electrode.

With the progress in various technical fields, there is an increasing demand for a powder, especially a metal powder or metal compound powder, possessing a specific property, and a powder with combined functions having a property other than the properties inherent only in a powder, especially a metal powder or metal compound powder is desired.

For example, in a magnetic metal powder for use as a raw material for a magnetic color toner, the magnetic metal powder cannot be used if the color thereof remains as it is, although this does not arise a problem in conventional black magnetic toners. Any conventionally known coated powder obtained by forming a thin metal oxide film on the surface of a powder for the purpose of surface modification, such as the protection of the powder or the facilitation of mixing the powder with a synthetic resin or the like does not satisfy the new requirements in such fields. From this viewpoint, it is necessary to provide a powder having a novel constitution that is not seen in any conventional powder.

As a useful method for forming a metal oxide in order to provide a powder, especially a metal powder or metal compound powder having combined properties satisfying the above new requirements and capable of realizing combined functions, there is disclosed a powder having a metal oxide film of a uniform thickness of 0.01 to 20 $\mu$m comprising a metal different from the metal constituting the base material of a metal or metal compound on the surface of the base material, the metal oxide film being formed by dispersing a metal powder or a metal compound powder in a metal alkoxide solution and hydrolyzing the metal alkoxide (JP-A-6-228604).

At the powder, when at least two layers of the above metal oxide film are formed, a special function can be imparted by controlling the thickness of each layer of the films. For example, when coating films having different refractive indexes are formed on the base material surface in a thickness corresponding to one-fourth the wavelength of an incident light, all the light is reflected. The application of this technique to a base material of a magnetic material, such as powder of a metal including iron, cobalt, nickel, etc., powder of an alloy thereof, or powder of iron nitride, can afford a magnetic powder for magnetic toner which reflects all the light and glitters with a white color. Furthermore, it is disclosed that a magnetic color toner is obtained by forming a colored layer on the powder and then a resin layer thereon (JP-A-7-90310).

Moreover, it was found that the control of the combination of the substances constituting the multilayered film and the thickness can adjust the waveform of interference of the reflected light at the multilayered film-coated powder, and there is disclosed a multilayered film having a stable color tone during a long period storage without using any dye or pigment (WO 96/28269).

The inventors have tried to develop a highly functional metal or metal compound powder by imparting another property other than the properties inherent in a metal or metal compound powder which is used as a base material, through the formation of a film of a metal oxide or a metal on the surface of a metal powder or a metal oxide powder.

In color printing or magnetic color printing for gift checks, ticket cards and the like, a special function for preventing the counterfeit other than visual or magnetic reading is required in addition to elegant coloring. For the purpose of answering such a trend, there is disclosed a color ink composition exhibiting an beautiful and stable color tone of blue, green, yellow or the like without using any dye or pigment through adjustment of the interference waveform of a reflected light at the above multilayered film, and having a function capable of enhancing the counterfeit-preventive effect of printed articles according to a mode other than visual or magnetic reading through the combined use of a reader for ultraviolet ray or infrared ray because of the existence of an interference reflection peak outside the visible light region besides the visible light region (JP-A-10-60350).

However, with the above color ink composition, an instrument for inspection is necessary because genuine/counterfeit is judged in combination with a reader for a reflected light of ultraviolet light or infrared light. It is inevitable to have a function which enables an easy genuine/counterfeit discrimination and further enhances the counterfeit-preventive effect of printed articles according to a new mode, and therefore, there exists a necessity of improvement.

DISCLOSURE OF THE INVENTION

Accordingly, an object of the present invention is to solve these problems, and to provide a fluorescent or luminous composition which not only is useful as an ink for color printing and coating of a monochromatic, beautiful and stable color tone, such as blue, green, yellow, or the like, a filler for papers or plastics, a coating material and an ink for high performance magnetic color printing, but also has a function enhancing a counterfeit-preventive effect of printed articles through enabling the genuine/counterfeit discrimination according to a convenient mode, for example, the irradiation with a fluorescent lamp in a room or a light source, such as ultraviolet lamp or infrared lamp, without using any new instrument for inspection.

Namely, the present invention relates to the following (1) to (10).

(1) A fluorescent or luminous composition, comprising a multilayered film-coated powder having at least two coating films on a base particle, and a fluorescent or luminous substance.

(2) The fluorescent or luminous composition according to the above (1), wherein at least one layer of the coating films contains the fluorescent or luminous substance.

(3) The fluorescent or luminous composition according to the above (1), wherein the multilayered film shows a light interference action.

(4) The fluorescent or luminous composition for counterfeit prevention according to the above (1), wherein the multilayered film shows a specific interference reflection peak or interference transmission bottom in a region besides the visible light region.

(5) The fluorescent or luminous composition according to the above (1), wherein the base particle is a magnetic particle.

(6) The fluorescent or luminous composition according to the above (1), which further contains a coloring agent.

(7) A genuine/counterfeit discrimination object, in which the fluorescent or luminous composition according to any one of the above (1) to (6) is adhered or contained.

(8) A genuine/counterfeit discrimination method, comprising recognizing fluorescence or luminescence by irradiating, with a light, the genuine/counterfeit discrimination object according to the above (7).

(9) The genuine/counterfeit discrimination method according to the above (8), wherein said method is combined with discrimination with at least one selected from magnetism, an electric field and an electron beam.

(10) Use of the fluorescent or luminous composition according to any one of the above (1) to (6) for genuine/counterfeit discrimination.

BEST MODE FOR CARRYING OUT THE INVENTION

As a result of the extensive studies, the present inventors have found that a pigment exhibiting a beautiful stable color tone of blue, green, yellow, or the like, even when it is used solely can be obtained by forming multilayered thin films having different refractive indexes on the surface of a powder to adjust the reflected light interference waveform of the multilayered film and mixing the powder with pigment fine particles emitting fluorescence or luminescence having a color the same as or different from the own color, or by incorporating, into at least one layer of the multilayered film, a pigment emitting fluorescence or luminescence having a color the same as or different from the own color or by forming a layer (film) of a fluorescent or luminous substance which does not participate in light interference, and at the same time, counterfeit prevention is enabled by simply discriminating presence of fluorescence or luminescence on a printed article. Base on these findings, the present invention has been accomplished.

Furthermore, they also found that various types of materials, such as a dielectric material or an electric conductor can be utilized as the base material of the above powder, and even when a magnetic material is used as the base material, the multilayered film-coated powder having a vivid color and fluorescence or luminescence can be obtained without deteriorating the magnetism.

As described above, the fluorescent or luminous composition of the present invention is useful as an ink for color printing and coating, a filler for papers or plastics, or a coating material. When a magnetic material is used as the base material, the composition is also employable as a color material of the ink for high performance magnetic color printing, and is capable of enhancing a counterfeit-preventive effect of printed articles since it possesses combined discriminating functions with eight types, i.e., visible light, non-visible light (ultraviolet region and infrared region), fluorescence or luminescence and magnetism, dielectrics (change of electric field), and electron beam and X-ray.

The base material of the multilayered film-coated powder to be used in the present invention is not particularly limited, and powders having various properties, such as magnetism, dielectricity, and conductivity, can be used. With regard to the kind of materials, a wide variety of substances, such as metals, metal compounds, organic substances, inorganic substances, and the like can be used.

The metals may be metals, such as transition metals including iron, nickel, chromium, titanium, cobalt, copper, aluminum, and the like; rare earth metals including neodymium, yttrium, and the like; or alloys thereof, such as alloys of the above metals including iron-nickel, iron-cobalt alloys, and the like. Furthermore, examples include iron-nickel alloy nitrides and iron-nickel-cobalt alloy nitrides; metal oxides, such as oxides of iron, nickel, chromium, titanium, aluminum, silicon (in this case, silicon is classified into metals), and the like; oxides of alkaline earth metals, such as calcium, magnesium, barium, and the like, composite oxides thereof; clays; glasses; and the like.

In the present invention, since its one object is to produce a powder having also magnetism, such as a magnetic color toner or a magnetic color ink, it is preferable to use a ferromagnetic material as the base material of the multilayered film-coated powder in the fluorescent or luminous composition of the present invention. The ferromagnetic material may be a metal having a large magnetic susceptibility, for example, a Atransition metal, such as iron, nickel, chromium, titanium, cobalt, copper, aluminum, or the like; a rare earth metal, such as neodymium, yttrium, or the like; or an alloy of the metals. Also, ferromagnetic oxides or ferromagnetic alloys, such as magnetite, Ba ferrite, Sr ferrite, γ-hematite, cobalt ferrite or mixed ferrites thereof can be used.

The organic substances are preferably resin particles. Specific examples thereof include cellulose powders, cellulose acetate powders, polyamides, epoxy resins, polyesters, melamine resins, polyurethanes, vinyl acetate resins, silicone resins, and spherical or pulverized particles obtained by the polymerization or copolymerization of acrylic esters, methacrylic esters, styrene, ethylene, propylene, and derivatives thereof. Particularly preferred resin particles are spherical acrylic resin particles obtained by the polymerization of an acrylic or methacrylic ester.

Usable as the inorganic substances are inorganic hollow particles, such as Shirasu balloons (hollow silicic acid particles) and the like, fine hollow carbon spheres (Kureca Sphere), fused alumina bubbles, aerosil, white carbon, fine hollow silica spheres, fine hollow calcium carbonate spheres, calcium carbonate, pearlite, talc, bentonite, kaolin, mica, synthetic micas, glass beads, and the like.

Examples of the shape of the core powder particle include isotropic shapes, such as sphere, nearly spherical shapes, regular polyhedrons, and the like; and polyhedrons, such as rectangular parallelepipeds, spheroids, rhombohedrons, plates, acicular shapes (cylinders and prisms), and the like. Also usable are powders of completely irregular shapes, such as pulverized particles and the like.

The particle size of the base material is not particularly limited but is preferably in the range of 0.01 $\mu$m to several millimeters.

In the present invention, coloring is effected with an interference color caused by coating the base particle with at least two coating layers which differ from each other in refractive index and which each has a suitably selected refractive index and a suitably selected thickness.

The material for constituting each coating layer is preferably selected freely from inorganic metal compounds, metals or alloys, and organic substances.

Typical examples of the inorganic metal compounds which may constitute the coating layers include metal oxides. Specific examples thereof include oxides of iron, nickel, chromium, titanium, aluminum, silicon, calcium, magnesium, barium and the like, or composite oxides thereof. Examples of the metal compounds other than metal oxides include magnesium fluoride, metal nitrides, such as iron nitride and the like, and metal carbides. Examples of the elemental metals which may constitute the coating layers include silver metal, cobalt metal, nickel metal, palladium metal, iridium metal, platinum, gold, iron metal, and the like. Examples of the metal alloys include alloys, such as silver-iridium, palladium-platinum, silver-palladium, platinum-palladium, and the like.

The organic substances which may constitute the coating layers are not particularly limited, and may be the same organic substance as that constituting the base material or different organic substances, but resins are preferred. Specific examples of the resins include cellulose, cellulose acetate, polyamides, epoxy resins, polyesters, melamine resins, polyurethane resins, vinyl resins, silicone resins, and polymers or copolymers of acrylic esters, methacrylic esters, styrene, ethylene, propylene, and derivatives thereof.

Although various materials can be used as the materials for constituting the coating layers, a suitable combination of materials should be selected according to applications while taking account of the refractive index of each coating layer.

The particle size of the multilayered film-coated powder according to the present invention is not particularly limited, and can be suitably regulated according to purposes. However, the size is generally in the range of 0.01 $\mu$m to several millimeters.

In the present invention, it is possible to form a coating film having a film thickness of the range of 5 nm to 10 $\mu$m at one film formation, which is thicker than the thickness obtained by a conventional method.

The total thickness of the coating films which are formed at two or more times is preferably 10 nm to 20 $\mu$m for the formation of coating films having good reflectance caused by the interference in the above-described color powder, and more preferred is the range of 20 nm to 5 $\mu$m. For causing the interference reflection of visible light at particularly thin film thickness, e.g., when the particle size is limited, the total thickness is preferably in the range of 0.02 to 2.0 $\mu$m.

The unit coating layers constituting the above at least two coating layers have film thickness determined so that the layers have interference reflection peaks or interference transmission bottoms at the same specific wavelength. More preferably, the thickness of each unit coating layer is determined by fixing the basic film thickness thereof which satisfies the following equation (1)

$$N \times d = m \times \lambda/4 \qquad (1)$$

(wherein N represents a complex refractive index; d represents a basic film thickness; m represents an integer (natural number); $\lambda$ represents a wavelength at which an interference reflection peak or interference transmission peak appears; and N is defined by the following equation (2):

$$N = n + i\kappa \qquad (2)$$

(wherein n represents a refractive index of each unit coating layer; i represents a complex number; and $\kappa$ represents an extinction coefficient)), and correcting the actual thickness of the unit coating layers based on the functions consisting of the phase shift caused by the extinction coefficient $\kappa$ of the refractive index, the phase shift occurring at film interfaces, and the peak shift attributable to refractive index dispersion and particle shape so that the unit coating layers have interference reflection peaks or interference transmission bottoms at the same specific wavelength as described above.

For forming the films, the following methods can be used according to the substances to be formed. However, other methods can be used.
(1) Formation of Organic Substance Film (Resin Film)
  a. Polymerization in Liquid Phase
  For example, a method wherein particles serving as base material are dispersed and emulsion polymerization is conducted to form a resin film on each particle can be used.
  b. Film Formation in Vapor Phase (CVD) (PVD)
(2) Formation of Inorganic Metal Compound Film
  a. Solid Deposition in Liquid Phase:
  A preferred method is to disperse particles serving as base material into a metal alkoxide solution and hydrolyze the metal alkoxide to thereby form a metal oxide film on particles. This method can form a dense metal oxide film. It is also possible to react an aqueous solution of a metal salt to thereby form a film of a metal oxide or the like on particles.
  b. Film Formation in Vapor Phase (CVD) (PVD)
(3) Formation of Metal Film or Alloy Film
  a. Reduction of Metal Salt in Liquid Phase
  The so-called chemical plating method is employed, wherein the metal salt contained in an aqueous metal salt solution is reduced to deposit the metal to thereby form a metal film.
  b. Film Formation in Vapor Phase (CVD) (PVD)
  A metal film can be formed on the surface of particles, for example, by the vapor deposition of a metal.

In the fluorescent or luminous composition of the present invention, the coating layer having a fluorescent or luminous substance (hereinafter, referred to as a "fluorescent or luminous layer") means a layer imparting fluorescent or luminous property to the above multilayered film-coated powder. The substance to be contained in the fluorescent or luminous layer is not particularly limited as long as it has a fluorescent or luminous property for the above multilayered film-coated powder, i.e., a property of emitting easily recognizable fluorescence or luminescence by the irradiation with ultraviolet light or visible light. However, preferred is a fluorescent or luminous substance which can retain the fluorescent or luminous property for a long period of time.

The fluorescent substance means a substance which is temporarily excited by an electromagnetic wave (light) having a specific wavelength and emits a light (especially, visible light) having a specific wavelength, and which does not emit without light source.

The fluorescent substance to be used for the above fluorescent layer is a fluorescent dye or a fluorescent pigment which is a generic term of a dye emitting fluorescence caused by absorbing an external energy, and which exhibits a photoluminescent color since fluorescence having approximately the same wavelength as that of the color of the dye is added to the own color. Examples include C.I. Acid Yellow 7 of a yellow acid dye emitting green fluorescence, C.I. Basic Red of a red basic dye emitting yellow to orange fluorescence, and the like.

Specific examples of the fluorescent substance to be used in the above fluorescent layer include the following but the present invention is not limited to these specific examples.

Specifically, for example, examples of organic fluorescent dyes include uranine, eosin, diaminotylbene, Thioflavine T, Rhodamine B, International Orange, and the like, and example of inorganic fluorescent dyes include calcium tungstate, lead-containing barium silicate, europium-containing strontium phosphate, europium-containing yttria, cerium-containing yttria, zinc sulfide containing one or more of copper or silver, tin, manganese, arsenic, aluminum, and cadmium, manganese-containing magnesium gallate, magnesium fluoride, calcium fluoride, oxygen-deficient zinc oxide, europium-containing zinc oxide, cerium-containing zinc oxide, cesium-containing zinc oxide, manganese or arsenic-containing zinc silicate, bismuth-containing cadmium zinc sulfide, bismuth-containing strontium calcium sulfide, and the like.

The luminous substance is a substance which can store light energy and continues the emission without light source after the irradiation with sunlight, a fluorescent lamp, or the like, and which emits a light having a specific wavelength for a certain period of time (several tens seconds to several tens hours).

Since a long time ago, metal sulfides are known as the luminous substances (phosphorescent materials). Examples thereof include CaS:Bi (Bi containing CaS) (purple-blue emission), CaSrS:Bi (Bi containing CaSrS) (blue emission), ZnS:Cu (Cu containing ZnS) (green emission), ZnCdS:Cu (Cu containing ZnCdS) (yellow to orange emission), and the like, and these are used in a luminous watch, an escape guiding sign, other night displays for indoor use, and the like.

Specific examples of the luminous substance to be used in the above luminous layer are shown below, but the present invention is not limited to these examples.

The luminous (light-storing) pigment is the one wherein a luminous property is imparted to a pigment, such as zinc sulfide by the addition of an activator, such as copper, manganese, mercury or the like. Examples thereof include powder of sulfides containing a trace amount of a metal, such as ZnCdS:Cu (Cu containing ZnCdS), CaS:Bi (Bi containing CaS), CaSrS:Bi (Bi containing CaSrS) and the like, and those obtainable by adding a rare earth metal, such as Eu, Dy or the like to oxides and salts, such as $Al_2O_3$, $SrCl_2$, and $BaCO_3$, alkaline earth metal aluminates, such as $SrAl_2O_4$, $CaAl_2O_4$, and the like, which exhibit a longer emission period and emit green, blue, yellow, or orange light.

In the fluorescent or luminous composition of the present invention, the constitution of the fluorescent or luminous substance and the above multilayered film-coated powder may be (1) an embodiment wherein the substance is adhered to the surface of the multilayered film-coated powder, (2) an embodiment wherein the fluorescent or luminous substance and the multilayered film-coated powder are mixed in a dry state in advance and the fluorescent or luminous substance is adhered to the surface of the multilayered film-coated powder, (3) an embodiment wherein the multilayered film-coated powder and the fluorescent or luminous substance is dispersed in the fluorescent or luminous composition, and the like. Alternatively, the fluorescent or luminous layer may be formed at any one of the following places: (4) on the surface of base particle of fluorescent or luminous multilayered film-coated powder, (5) in the coherent multilayered coating films formed on the surface of a base material, or (6) on the surface of the multilayered film-coated powder.

As mutual embodiments (1), (2), and (3) of the constitution of the fluorescent or luminous substance and the multilayered film-coated powder, the following methods are exemplified.

(1) A method of mixing the multilayered film-coated powder and the fluorescent or luminous substance (fluorescent or luminous particles having a particle size smaller than that of the particles of the multilayered film-coated powder) dispersed in a solvent, and adhering them through heterocoagulation.

(2) A method of preparation by mixing fluorescent or luminous particles having a particle size smaller than that of the particles of the multilayered film-coated powder in dry conditions.

In the above two methods, the resulting powder is preferably subjected to heat treatment, if necessary.

Moreover, the fluorescent or luminous substance adhered to the surface of the multilayered film-coated powder preferably remains adhered to the powder. However, the fluorescent or luminous substance may be separated and dispersed in the fluorescent or luminous composition. At the application wherein it is essential to recognize the property of the multilayered film-coated powder and the property of the fluorescent or luminous substance among the applications for counterfeit prevention and the like, it is more preferred that both of the substance and the powder are integrated. The reason is that more complicated counterfeit prevention is possible by using the fluorescence or luminescence or emission property and other functions of the multilayered film-coated powder, separately.

Furthermore, in order not to hide the color of the multilayered film-coated powder, the substance is preferably white and transparent or near white and transparent as far as possible, or has a color the same as that of the multilayered film-coated powder. However, this does not apply when multilayered film-coated powder is colored to the other color by the fluorescent or luminous substance.

(3) In the method of dispersing the fluorescent or luminous composition in which the multilayered film-coated powder and the fluorescent or luminous substance is dispersed, using the multilayered film-coated powder and the fluorescent or luminous substance of the above (1) or (2), as the dispersing medium, hitherto known varnish used for color printing or magnetic color printing can be used and, for example, a liquid polymer, a polymer or monomer dissolved in an organic solvent, or the like can be freely selected and used according to the kind of the powder, the application method of ink, and the uses.

By the way, in the fluorescent or luminous composition of the above (3) which is a dispersion in a dispersing medium, the multilayered film-coated powder and the fluorescent or luminous substance are separately dispersed in the dispersing medium.

The following three methods can be used for the constitutions of the fluorescent or luminous layers of the above (4), (5), and (6).

(4) A layer comprising the fluorescent or luminous substance as the main component is formed and the fluorescent or luminous layer participates in the interference of visible light.

(5) A layer comprising the fluorescent or luminous substance as the main component is formed and the fluorescent or luminous layer does not participate in the interference of visible light (it is preferable not to reduce the effect of the interference of visible light).

(6) A layer containing the fluorescent or luminous substance dispersed in the coating film which participates in the interference of light.

The following methods may be mentioned as the outline of the methods of forming the fluorescent or luminous layers of the above (4), (5), and (6).

(4) When a layer comprising the fluorescent or luminous substance as the main component is formed and the fluorescent or luminous layer participates in the interference of visible light, using a high refractive index layer or a low refractive index layer selected based on the refractive index, a film colored by the occurrence of interference reflection of visible light and emitting fluorescence or luminescence at the same time is formed by designing the refractive index and the film thickness so as to satisfy the light-interference conditions.

The formation of the film is carried out by a sol-gel method or a method utilizing the precipitation to the surface, e.g., a solid layer precipitation from an aqueous solution.

The resulting powder is preferably subjected to heat treatment, if necessary. When the film material tends to thermally decompose, it is preferred to form the fluorescent or luminous layer as the outermost layer.

(5) When the layer comprising the fluorescent or luminous substance as the main component is formed and the fluorescent or luminous layer does not participate in the interference of visible light, the fluorescent or luminous substance film is formed as a sufficiently thin film so as not to occur the interference at the outermost layer. In this case, the fluorescent or luminous substance film may be a film comprising fine particles.

The formation of the film is carried out by a sol-gel method or a method utilizing the precipitation to the surface, e.g., a solid layer precipitation from an aqueous solution.

Alternatively, it is carried out by a method of mixing fine particles of the fluorescent or luminous substance (fluorescent or luminous particles having a particle size smaller than that of the base material) dispersed in a solvent, and adhering them through hetero-coagulation.

In the above two methods, the resulting powder is preferably subjected to heat treatment, if necessary. When the film material tends to thermally decompose, it is preferred to form the fluorescent or luminous layer as the outermost layer.

(6) When the layer containing the fluorescent or luminous substance dispersed in the coating film which participates in the interference of light is formed, one method comprises steps of mixing the fluorescent or luminous substance with a raw composition by dissolution or dispersion and forming a film using the resulting mixture.

In order to incorporate the fluorescent or luminous substance to the high refractive index layer or low refractive index layer for interference, fine particles of the fluorescent or luminous substance (fluorescent or luminous particles having a particle size smaller than that of the base material) is mixed in a solvent containing raw materials at film formation and then film formation is carried out to incorporate the particles to one or more layers. In this case, it is preferred to incorporate the particles to outer layers and to many layers as far as possible. Furthermore, it is possible to form the film after the fluorescent or luminous substance is adsorbed to the base particles through hetero-coagulation.

Moreover, the alternative method for forming the layer containing the fluorescent or luminous substance dispersed in the coating film which participates in the interference of light comprises steps of forming a multilayered film-coated powder, subjecting it to heat treatment, and immersing the multilayered film-coated powder in a solution of fluorescent or luminous substance to achieve the impregnation.

When the outermost layer is subjected to heat treatment, the outermost layer is made porous by, for example, adding an additive at film formation or increasing the temperature or the heat-treating period of time, and the powder is formed by impregnating the voids with the fluorescent or luminous substance dispersed or dissolved in a solvent.

As an example, the method of forming an alternative multilayered film of a metal oxide having high refractive index and a metal oxide having a low refractive index which contains a fluorescent or luminous substance is specifically explained. First, a titanium oxide film or a zirconium oxide film is formed as a high refractive index film on the surface of base particles by dispersing the base particles into an alcohol solution where an alkoxide of titanium, zirconium or the like is dissolved, and adding dropwise thereto a mixed solution of water, an alcohol, and catalyst under stirring to hydrolyze the above alkoxide. Thereafter, the powder is separated from the mixture, dried, and then subjected to heat treatment. The drying may be effected by any of vacuum heat drying, vacuum drying or air drying. It is also possible to use an apparatus, such as spray dryer in an inert atmosphere with controlling the atmosphere. The heat treatment is carried out at 150 to 1100° C. (when the core particle of the powder is an inorganic powder) or 150 to 500° C. (when the core particle of the powder is other than the inorganic powder) for 1 minute to 3 hours in air in a coating film composition which is not oxidized or in an inert atmosphere in a coating film composition which is susceptible to oxidation. Then, a film of silicon oxide or aluminum oxide is formed as a low refractive index film on the surface of the powder coated with the above high refractive index film, by dispersing the powder, on which the above high refractive index film has been formed, into an alcohol solution in which a metal alkoxide exhibiting a low refractive index when converted to oxide and a fluorescent or luminous substance are dissolved, and adding dropwise a mixed solution of water, an alcohol and a catalyst under stirring to hydrolyze the above alkoxide. The high refractive index film or low refractive index film can be formed in an aqueous solvent to which a buffer is added, and the film formation can be carried out by decomposing and precipitating a raw material, for example, titanium sulfate, titanium chloride or the like for the high refractive index film, and water glass, aluminum sulfate or the like for the low refractive index film. Thereafter, the powder is separated from the mixture, dried under vacuum, and then subjected to heat treatment as described above. By this operation, a fluorescent or luminous film-coated powder having two layers on the surface of the powder base particles is obtained, and by repeated operations of forming metal oxide films having a high refractive index, a fluorescent or luminous multilayered film-coated powder having a multilayered metal oxide film is obtained.

Further more, a special function can be imparted by controlling the thickness of each layer of the alternative coating films differing in refractive index formed on the surface of the base powder particles. For example, on the surface of the base particles, alternative coating films differing in refractive index, which each is made of a substance having a refractive index n and has a thickness d corresponding to m (integer) times the value which is one-fourth a wavelength of visible light so as to satisfy the following equation (3), are formed in an appropriate thickness and number. As a result, the light having a specific wavelength λ (the light utilizing Fresnel's interference reflection) is reflected or absorbed.

$$nd = m\lambda/4 \qquad (3)$$

This function is utilized as follows. A film having such a thickness and refractive index as to satisfy equation (3) with respect to a target wavelength of visible light is formed on the surface of base particles, and this film is coated with a film having a different refractive index. This procedure is conducted once or repeated one or more times to thereby form films which have a characteristic reflection or absorption wavelength width in the visible light region. In the above procedure, the order of material deposition for film formation is determined in the following manner. When the base particles themselves have a high refractive index, a film having a low refractive index is preferably formed as the first layer. In the reverse case, a film having a high refractive index is preferably formed as the first layer.

Film thickness is controlled based on a measurement in which the change of optical film thickness, which is the product of the refractive index of the film and the film thickness, is determined as a reflection waveform with a spectrophotometer or the like. The thickness of each layer is designed so that the reflection waveform conforms to the finally required waveform. For example, when the unit coating films constituting a multilayered film have reflection waveform peaks at different positions, the powder becomes white. In contrast, when the unit coating films are regulated so that the reflection waveform peaks thereof are in exactly the same position, a monochromatically colored powder, e.g., a blue, green, or yellow powder, can be obtained without using any dye or pigment.

However, in an actual powder, a design should be made while taking account of the particle size and shape of the powder, the phase shift occurring at interfaces between film materials and the core particle material, the peak shift attributable to the wavelength dependence of the refractive index, etc. For example, when the core particles have a plane parallel plate shape, the Fresnel's interference caused by parallel films formed on a plane surface of the particle is designed under the conditions that n in the above equation (3) has been replaced with N defined by the following equation (4). In particular, when a metal film is contained, extinction coefficient κ is included in the refractive index N of the metal defined by equation (4) even though the particle shape is a plane parallel plate shape. In transparent oxides (dielectrics), κ is exceedingly small and negligible.

$$N = n + i\kappa (i \text{ represents a complex number}) \qquad (4)$$

When the extinction coefficient κ is large, an enhanced phase shift occurs at the interface between the film material and the core particle material, and this phase shift influences the optimum interference thickness of all layers of the multilayered film.

Because of the above, the mere regulation of geometrical film thickness results in different peak positions and hence, in a lighter color especially at monochromatic coloring. In order to avoid this, a design is made beforehand through a computer simulation so as to result in an optimal combination of film thickness while taking account of influences of the phase shift on all films.

Also, there are the phase shift caused by an oxide layer present on a metal surface and the peak shift attributable to the wavelength dependence of refractive index. In order to correct these, it is necessary to use a spectrophotometer or the like to find optimal conditions under which reflection peaks or absorption bottoms appear at target wavelengths in a final target number of films.

In a film formed on a curved surface, such as a spherical powder or the like, interference occurs similarly to that on plane plates and is basically in accordance with Fresnel's interference principle. Consequently, a coloring method can be designed so as to produce a monochromatic powder. However, in curved surfaces, the light which has struck on the powder and has been reflected causes complicated interference. The resulting interference waveforms are almost the same as on plane plates when the number of films is small. However, as the total number of films increases, the interference within the multilayered film becomes more complicated. In a multilayered film, also, a spectral reflection curve can be designed beforehand based on Fresnel's interference through a computer simulation so as to result in an optimal combination of film thickness. In particular, when coating films are formed on the surface of a base powder particle, the influences of a phase shift on the base powder particle surface and on all films are taken into account when a design is made beforehand through a computer simulation so as to result in an optimal combination of film thickness. Furthermore, the peak shift caused by a coating layer present on the base powder particle surface and the peak shift attributable to the wavelength dependence of the refractive index are also taken into account. In the actual production of a sample, designed spectral curves are referred to and, in order to correct these in actual films, it is necessary, by using a spectrophotometer or the like, while changing film thickness, to find optimal conditions under which reflection peaks or absorption bottoms appear at target wavelengths in a final target number of films. Also, when a powder having irregular particle shapes is colored, interference occurs due to the multilayered film. A basic film design is hence made with reference to the conditions for an interference multilayered film of the spherical particles. The peak position for each of the unit coating films constituting the multilayered film can be regulated by changing the thickness of the layer, and the film thickness can be regulated by changing the solution composition, reaction time, and the number of starting-material addition times. Thereby, the powder can be colored in a desired tint. As described above, a monochromatic powder can be obtained by finding optimal conditions under which reflection peaks or absorption bottoms appear at target wavelengths in a final target number of films, while changing conditions for film formation, such as solutions for film formation and the like. Furthermore, by controlling a combination of materials for constituting a multilayered film and the thickness of each unit coating film, the color development by interference in the multilayered film can be regulated. Thereby, a powder can be colored in a desired vivid tint without using a dye or pigment. However, it is possible to form a coating layer or a colored layer with use of a coloring agent, if necessary.

Specific examples of the above coloring agent to be used optionally are shown below, but the present invention is not limited to the examples.

Specifically, examples of blue coloring agents include (organic dyes) phthalocyanine dyes, oil dyes, lake dyes, etc., (cyan dyes) phthalocyanine dyes, lake dyes, etc., (inorganic pigments) powder of metal oxides, such as titania, alumina, silica, zirconia, ceria, zinc oxide, etc., composite oxide pigments, such as cobalt aluminate, etc., and the like. Examples of yellow coloring agents include (organic dyes) monoazo dyes, azomethine dyes, oil dyes, lake dyes, etc., (pigments) benzidine-type yellow pigments, phorone yellow, acetoacetanilides, insoluble pigments, and the like. Examples of green coloring agents include (organic dyes) phthalocyanine-type green dyes, lake dyes, such as Malachite Green, oil dyes, etc., (organic pigments) naphthol-type green pigments, such as Pigment Green, green insoluble azo pigments, such as Green Gold, phthalocyanine green pigments, etc., (inorganic pigments) cobalt green (CoO-Zn-MgO), viridian, emerald green, chrome green, and the like. Examples of red coloring agents include (organic dyes) lake red dyes, oil red dyes, etc., (organic pigments) naphthol-type red insoluble azo pigments, red insoluble azo pigments, red naphthol pigment, red lake pigments, etc., (inorganic pigments) red lead, cadmium red, and the like. Examples of magenta coloring agents include (dyes) anthraquinone-type dyes, thioindigo, oil-type magenta dyes, etc., (pigments) xanthene-type magenta dyes of phosphorus-tungsten-molybdate lake pigments, 2,9-dimethylquinacridone, naphthol insoluble azo pigments, coloring materials comprising xanthene dyes and organic carboxylic acids, and the like. Examples of cyan coloring agents include (organic dyes) phthalocyanine dyes, oil dyes, lake dyes, etc., (organic pigments) phthlocyanine pigments, lake pigments, (inorganic pigments) powder of metal oxides, such as titania, alumina, silica, zirconia, ceria, zinc oxide, etc., composite oxide pigments, such as cobalt aluminate, etc., and the like.

Furthermore, a toning agent can be used, if necessary. The toning agent fundamentally regulates the color, and is used for matching color to a desired color using at least two coloring agents. Specific examples of the toning agent to be used are shown below. However, the present invention is not limited to the examples, and it is possible to tone the color by adding other pigments and dyes, if necessary.

Specifically, examples of blue toning agents include (organic dyes, pigments) lake dyes, such as alkali blue lake, peacock blue lake, etc., lake pigments, phthlocyanine-type pigments, such as metal-free phthlocyanine, copper phthlocyanine, etc., and the like, (inorganic pigments) oxide-sulfide composite pigments, such as ultramarine, etc., copper-type ultramarine-Prussian blue pigments, such as iron blue, Milori blue, etc., cobalt oxide-type composite oxides blue pigments, such as cobalt blue, cerulean blue, etc., and the like. Examples of yellow toning agents include (organic dyes) fast dyes, such as fast yellow, etc., and the like, (organic pigments) azo pigments, such as Hansa Yellow, naphthol yellow, pigment yellow, permanent yellow, etc., (inorganic pigments) chromates of lead, zinc, barium, etc. (chrome orange, chrome vermilion), sulfides, such as cadmium sulfide, etc., composite oxide-type pigments, such as titan yellow, etc., and the like. Examples of green toning agents include (organic dyes) lake dyes, such as malachite green lake, acid green lake, etc., and the like, (organic pigments) nitroso pigments, such as pigment green, naphthol green, etc., azo pigments, such as green gold, etc., phthlocyanine-type pigments, such as phthlocyanine green, polychrome copper phthlocyanine, etc., and the like, (inorganic pigments) chromium-type oxides and hydrated oxides, such as chrome green, zinc green, chromium oxide, hydrated chrome (viridian), etc., copper-type oxides, such as emerald green, etc., cobalt-type oxides, such as cobalt green, etc., and the like. Examples of red toning agents include (organic dyes) lake dyes, such as eosin lake, rhodamine lake, etc., quinacridone-type dye-pigments, such as Cinquasia Red, etc., (organic pigments) azo pigments, such as Permanent Red, Para Red, etc., fast pigments, such as Brilliant Fast Red, Fast Scarlet, etc., (inorganic pigments) sulfide pigments, such as cadmium red, mercury red, etc., and the like. Examples of orange toning agents include (organic pigments) azo pigments, such as Permanent Orange, benzine orange, Hansa Yellow, etc., and the like, (inorganic pigments) oxides (chrome orange), such as lead chromate, etc., composites comprising chromic acid and lead sulfate (chrome vermilion), and the like. Examples of purple toning agents include (organic dyes) lake dyes, such as Methyl Violet Lake, etc., and the like, (organic pigments) azo pigments, such as Fast Violet, etc., and the like, (inorganic pigments) pigments of phosphates, such as cobalt phosphate, manganese phosphate, etc., composite oxides, such as cobalt-arsenic, and the like.

Furthermore, a toning agent for enhancing brightness may be a white pigment (color-spreader), and examples thereof include oxides, such as titanium oxide, zinc oxide, tin oxide, silicon oxide, antimony oxide, lead oxide, etc., or composite oxides thereof, carbonates, such as calcium carbonate, magnesium carbonate, barium carbonate, etc., or sulfates, such as barium sulfate, calcium sulfate, sulfides, such as zinc sulfide, or composite oxide and composite hydroxides obtainable by sintering the above oxides, carbonates and sulfates.

With regard to the preparation of the fluorescent or luminous composition of the present invention thus obtainable, the following will explain each of (1) a color ink or coating material-like composition (fluid) and (2) a color toner or color dry ink-like composition (powder). (1) As a medium (vehicle) for the color ink or coating material-like composition (fluid), a hitherto known varnish used for color printing, magnetic color printing or magnetic color coating material is usable in the present invention. For example, a liquid polymer, a polymer or monomer dissolved in an organic solvent, or the like can be suitably selected and used according to the kind of the powder, the method of applying the ink, and the use thereof.

Examples of the above liquid polymer include dienes, such as polypentadiene, polybutadiene, and the like, polyethylene glycols, polyamides, polypropylenes, waxes, copolymers and modified substances thereof, and the like.

Examples of the polymer to be dissolved in an organic solvent include olefin polymers, acrylic resins, such as oligoester acrylates etc., polyesters, polyamides, polyisocyanates, amino resins, xylene resins, ketone resins, diene resins, rosin-modified phenolic resins, diene rubbers, chloroprene resins, waxes, modified substances and copolymers thereof, and the like.

Examples of the monomer to be dissolved in an organic solvent include styrene, ethylene, butadiene, propylene, and the like.

Examples of the solvent include alcoholic solvents, such as ethanol, isopropanol, n-propanol, and the like, ketone solvents, such as acetone, and the like, hydrocarbons, such as benzene, toluene, xylene, kerosine, benzine, and the like, and esters, ethers, or modified substances and copolymers thereof, and the like.

(2) With regard to a color toner, color dry ink, and color dry coating material-like composition (powder), a powdery fluorescent or luminous composition can be obtained by directly kneading the fluorescent or luminous multilayered film-coated powder with a resin and, if necessary, a coloring agent, and then pulverizing the resulting mixture. Alternatively, the multilayered film-coated powder can also be transformed into a powdery fluorescent or luminous composition by use of a polymerization method, such as emulsion polymerization or suspension polymerization.

In the powdery fluorescent or luminous composition:

(a) the resin to be used in the above pulverization method is not particularly limited but includes polyamides, epoxy resins, polyesters, melamine resins, polyurethanes, vinyl acetate resins, silicon resins, polymers or copolymers of acrylic esters, methacrylic esters, styrene, ethylene, butadiene, propylene, derivatives thereof, and the like;

(b) in the polymerization method, polymerization is carried out starting with one or more of an ester, an urethane, vinyl acetate, an organic silicon, acrylic acid, methacrylic acid, styrene, ethylene, butadiene, propylene, and the like to form a polymer or a copolymer thereof.

As described above, the fluorescent or luminous composition of the present invention is prepared in the forms of (1) a color ink or coating material-like composition (fluid) and (2) a color toner or color dry ink-like composition (powder).

The fluid type includes a color ink, a coating material, and the like, which may contain components, such as an above-described coloring agent or toning agent, a solidification-accelerator for a slowly drying resin, a thickening agent for increasing viscosity, a fluidizing agent for reducing viscosity, a dispersant for dispersing particles, and the like.

On the other hand, in the powder type:

(a) when the powder is prepared by the pulverizing method, components, such as an above-described coloring agent or toning agent, a solidification-accelerator for a slowly drying resin, a fluidizing agent for reducing viscosity at kneading, a dispersant for dispersing particles, a charge regulator for fixing to paper, etc., a wax, and the like may be contained.

(b) in the polymerization method, components, such as an above-described coloring agent or toning agent, a polymerization initiator, a polymerization accelerator, a thickening agent for increasing viscosity, a dispersant for dispersing particles, a charge regulator for fixing to paper, etc., a wax, and the like may be contained.

The multilayered film-coated powder in the fluorescent or luminous composition of the present invention can be applied not only to a wet or dry color printing or a wet or dry magnetic color printing with single powder or a combination of at least two powders having a different spectral property, but also to other uses requiring a security function, such as a magnetic color ink for counterfeit prevention of printed articles because the powder possesses combined discriminating functions with eight types, i.e., visible light, non-visible light (ultraviolet region and infrared region), fluorescence or luminescence and magnetism, electricity (change of electric field), and electron beam and X-ray using powders of the three primary colors.

The base material of the target printed article is any material which can be printed with an ink or the like, or can be filled or applied as a functional filler, without limitation. Examples thereof include papers, polymers, resins (for example, plastics etc.), glasses, metals (for example, aluminum, etc.), fibers (for example, woven fabrics, knitted fabrics, etc.), leather (natural leather, synthetic leather, etc.), and the like.

When the above-described fluorescent or luminous composition of the present invention is printed, melt-transcribed or applied on a base material or a body to be coated as a color ink or coating material composition or a color toner, color dry ink or color dry coating material composition, the relationship between the contents of the fluorescent or luminous multilayered film-coated powder and the resin in the fluorescent or luminous pigment or coating material composition is such that the ratio therebetween is 1:0.5 to 1:15 by volume. When the content of the medium is too low, the film coated does not tenaciously adhere to the body to be coated. When it is too high, the ink or coating material is unsatisfactory since the pigment color is too light. The relationship between the total amount of the pigment and the resin and the amount of the solvent in the color ink or coating material composition is such that the ratio therebetween is 1:0.5 to 1:10 by volume. When the amount of the solvent is too small, the coating material has too high a viscosity to be evenly applied. When the amount is too large, it takes much time to dry the coating film and coating efficiency extremely decreases.

The color density of a coating film formed by printing or melt-transcribing the composition on a base material, applying the coating material to a body to be coated is determined by the amount of the pigment contained per unit area of the body to be coated. A satisfactory coating color is obtained when the amount of the fluorescent or luminous multilayered film-coated powder of the present invention contained on the body to be coated is 5 to 300 g, preferably 10 to 150 g, in terms of areal density, per square meter after drying. When the areal density is below the above value, the color of the body to be coated is visible. The areal density exceeding the above value is uneconomical because the color density of the coating does not change any more. Namely, even when the pigment is contained in a thickness larger than a given value on the body to be coated, light does not reach pigment located on the lower side of the coating film. Forming a coating film in a thickness larger than such a value is uneconomical since it does not enhance the effect of coating because that thickness exceeds the hiding powder of the coating material. However, this does not apply when the coating material is applied thickly while taking account of the decrease in coating film thickness caused by wearing.

Furthermore, the fluorescent or luminous composition of the present invention may be contained in a base material beforehand. The material of the target is not particularly limited but it is added at the production of shaped products of polymers, resins (for example, plastics etc.), etc., glasses, metals (for example, aluminum, etc.), fibers (for example, woven fabrics, knitted fabrics, etc.), leather (synthetic leather, etc.), and the like.

Moreover, it is also possible to incorporate, into a base material, a desired shaped and sized article obtainable by printing or coating a granule or thin slip of a plastic, a metal, a ceramic or the like, with the colored magnetic powder particles.

The base material where the fluorescent or luminous composition of the present invention is adhered or contained as above can be used as a genuine/counterfeit discrimination object. Namely, by irradiating the object with a light (visible light, ultraviolet light, infrared light, etc.), the genuine/counterfeit of the object can be judged by observing fluorescence or luminescence. Moreover, the accuracy of the genuine/counterfeit can be enhanced by combining the discrimination with at least one selected from magnetism, electric field, electron beam and X-ray.

The present invention will be explained in more detail by reference to Examples. However, the present invention should not be construed as being limited to these Examples.

EXAMPLE 1

Embodiment in Which a Magnetic Material was Coated with a Multilayered Film and a Fluorescent Material was Transformed to a Coating Material by Mixing and Dispersing First Layer, Silica Coating:

Into an ethanol solution prepared beforehand by dissolving 3.5 g of silicon ethoxide in 158.6 g of ethanol was dispersed 20 g of a carbonyl iron powder (average particle size, 1.8 μm; magnetization at 10 kOe, 203 emu/g) manufactured by BASF. Thereafter, a mixed solution of 8.0 g of ammonia water (29%) and 8.0 g of deionized water was added to the dispersion under stirring. After the addition, the resulting mixture was reacted at ordinary temperature for 5 hours. After the reaction, washing under dilution with a sufficient amount of ethanol, filtration and drying in a vacuum drier at 110° C. for 3 hours were conducted. After the drying, the product was subjected to heat treatment using a rotary tubular oven at 800° C. for 30 minutes in a nitrogen atmosphere and then cooled to obtain a silica coated iron powder $A_1$.

Second layer, Titania coating:

In a separable flask, into an ethanol solution prepared beforehand by dissolving 4.6 g of titanium isopropoxide in 198.3 g of ethanol was dispersed 20 g of the powder $A_1$. Thereafter, a solution prepared beforehand by mixing 6.0 g of pure water with 47.9 g of ethanol was added dropwise to the dispersion under stirring over 1 hour. After the addition, the resulting mixture was reacted at ordinary temperature for 4 hours. After the reaction, washing under dilution with a sufficient amount of ethanol, filtration and drying in a vacuum drier at 110° C. for 3 hours were conducted. After the drying, the product was further subjected to heat treatment using a rotary tubular oven at 650° C. for 30 minutes in a nitrogen atmosphere and then cooled to obtain a silica-titania coated iron powder $A_2$. The resulting powder $A_2$ had satisfactory dispersibility and was composed of independent particles. The titania film of the powder $A_2$ had a thickness of 55 nm.

The powder $A_2$ had a spectral reflection curve having a peak wavelength of 463 nm and had a reflectance at the peak wavelength of 37%. It was vivid blue-green.

Furthermore, the powder $A_2$ had a magnetization of 176 emu/g at 10 kOe.

Third Layer, Silica Coating:

Into an ethanol solution prepared beforehand by dissolving 3.5 g of silicon ethoxide in 158.6 g of ethanol was dispersed 20 g of the powder $A_2$. Thereafter, a mixed solution of 8.0 g of ammonia water (29%) and 8.0 g of deionized water was added to the dispersion under stirring. After the addition, the resulting mixture was reacted at ordinary temperature for 5 hours. After the reaction, washing under dilution with a sufficient amount of ethanol, filtration and drying in a vacuum drier at 110° C. for 3 hours were conducted. After the drying, the product was subjected to heat treatment using a rotary tubular oven at 800° C. for 30 minutes in a nitrogen atmosphere and then cooled to obtain a silica-titania-silica coated iron powder $A_3$. Fourth Fourth Layer, Titania Coating:

In a separable flask, into an ethanol solution prepared beforehand by dissolving 4.6 g of titanium isopropoxide in 198.3 g of ethanol was dispersed the powder $A_3$. Thereafter, a solution prepared beforehand by mixing 6.0 g of pure water with 47.9 g of ethanol was added dropwise to the dispersion under stirring over 1 hour. After the addition, the resulting mixture was reacted at ordinary temperature for 4 hours. After the reaction, washing under dilution with a sufficient amount of ethanol, filtration and drying in a vacuum drier at 110° C. for 3 hours were conducted. After the drying, the product was further subjected to heat treatment using a rotary tubular oven at 650° C. for 30 minutes in a nitrogen atmosphere and then cooled to obtain a silica-titania-silica-titania coated iron powder $A_4$. The resulting powder $A_4$ had satisfactory dispersibility and was composed of independent particles. The titania film of the fourth layer of the powder $A_4$ had a thickness of 56 nm.

The powder $A_4$ had a spectral reflection curve having a peak wavelength of 435 nm and had a reflectance at the peak wavelength of 46%. It showed vivid cyan color.

Furthermore, the powder $A_4$ had a magnetization of 132 emu/g at 10 kOe.

Treatment for Making the Powder Hydrophobic:

Into an ethanol solution prepared beforehand by dissolving 0.5 g of silicon ethoxide in 158.6 g of ethanol was dispersed 20 g of the powder $A_4$. Thereafter, a mixed solution of 3.0 g of ammonia water (29%) and 3.0 g of deionized water was added to the dispersion under stirring. After the addition, the resulting mixture was reacted at ordinary temperature for 1 hour. After the reaction, washing under dilution with a sufficient amount of ethanol, filtration and drying in a vacuum drier at 110° C. for 3 hours were conducted. After the drying, the product was cooled to obtain a hydrophobicity-enhanced silica-titania-silica-titania coated iron powder $A_5$.

Preparation of Fluorescent Pigment Composition, Mixing and Dispersing Fluorescent Material:

Into an ethanol solution prepared beforehand by dissolving 2.5 g of an acrylic polymer (Trademark: Technovit, manufactured by Kulzer Co.) in 80 g of ethanol was dispersed 30 g of the resulting powder $A_5$. Thereafter, 18 g of fine particles of copper-containing cadmium zinc sulfide (a fluorescent substance), 20 g of titanium oxide (a hydrophobicity-enhanced product treated with silicon: color-spreader), and 3.2 g of hydroxypropyl cellulose were added thereto and the mixture was subjected to dispersing treatment in a zirconia ball mill for 8 hours to obtain a coating material dispersion $AL_1$ of a fluorescent pigment composition.

Application and Spectral Characteristics:

The above coating material dispersion $AL_1$ of the fluorescent pigment composition was applied to an art paper with a blade coater. The applied amount (after drying) of the fluorescent pigment composition was 59 g/m$^2$.

Figure 1:
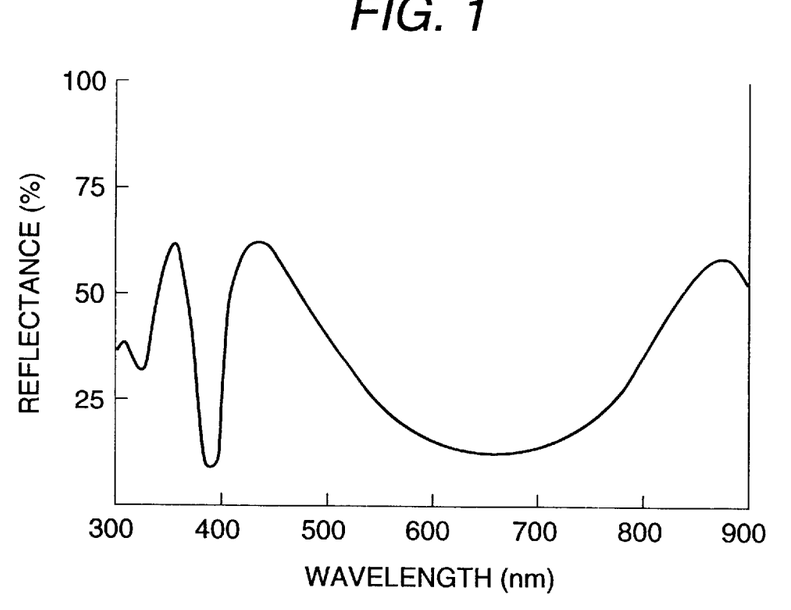
FIG. 1 is a graph showing a spectral reflectance curve of the fluorescent pigment composition obtained in Example 1.

The spectral reflectance curve of the applied paper 1 obtained after drying is shown in FIG. 1. Furthermore, the color of the applied paper 1 had a peak wavelength of 433 nm and a bright cyan color having a reflectance of 65%.

Figure 2:
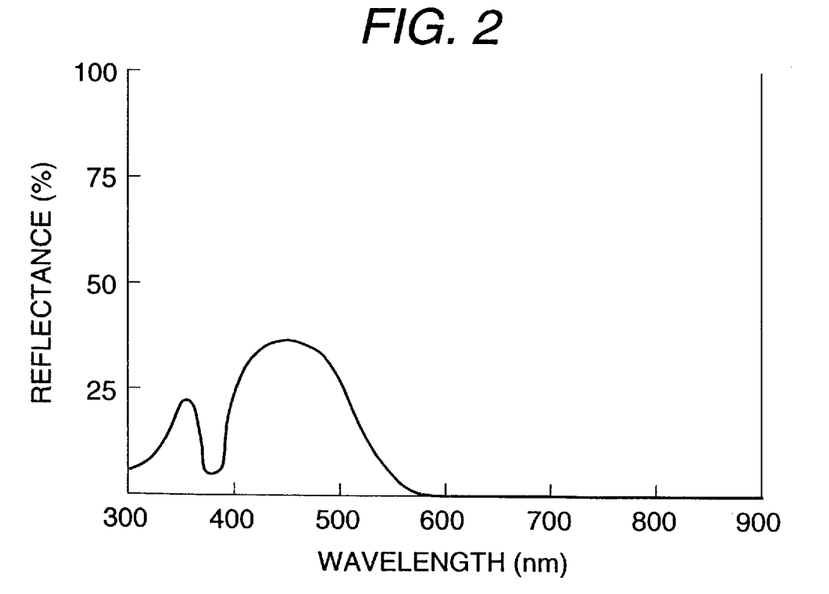
FIG. 2 is a graph showing a fluorescent spectral reflectance curve of the fluorescent pigment composition obtained in Example 1.

Moreover, the applied paper reflected a light of around 365 nm in the ultraviolet region with a reflectance of 67%, and also reflected a light of around 870 nm in the infrared region with a reflectance of 56%. Thus, the recognition and discrimination of both the lights permits the genuine/counterfeit discrimination with four types, i.e., magnetism, and visible light, ultraviolet light, and infrared light. In addition, when the applied paper 1 was irradiated with an ultraviolet lamp, it emitted a pale blue fluorescence (FIG. 2).

Furthermore, the applied paper 1 had a magnetization of 3175 emu/m² at 10 kOe.

COMPARATIVE EXAMPLE 1

Embodiment in Which a Magnetic Material was Coated ith a Multilayered Film and a Fluorescent Material was not Mixed The same operations as in Example 1 were carried out. However, fine particles of copper-containing cadmium zinc sulfide were not mixed to the dispersion at the preparation of the fluorescent pigment composition.

The applied paper had a reflection peak at 433 nm in the visible light region, at which the reflectance was 65%. The emission of fluorescence was not observed even when the applied paper 2 was irradiated with an ultraviolet lamp in a dark place.

EXAMPLE 2

Embodiment in Which a Magnetic Material was Coated with a Multilayered Film, a Fluorescent Material was Mixed and Dispersed, and the Materials Were Powdered by Spray Drying First Layer, Silica Coating:

Into an ethanol solution prepared beforehand by dissolving 4.4 g of silicon ethoxide in 158.6 g of ethanol was dispersed 20 g of a carbonyl iron powder (average particle size, 1.8 μm; magnetization at 10 kOe, 203 emu/g) manufactured by BASF. Thereafter, a mixed solution of 8.0 g of ammonia water (29%) and 8.0 g of deionized water was added to the dispersion under stirring. After the addition, the resulting mixture was reacted at ordinary temperature for 5 hours. After the reaction, washing under dilution with a sufficient amount of ethanol, filtration and drying in a vacuum drier at 110° C. for 3 hours were conducted. After the drying, the product was subjected to heat treatment using a rotary tubular oven at 800° C. for 30 minutes in a nitrogen atmosphere and then cooled to obtain a silica coated iron powder $B_1$.

Second Layer, Titania Coating:

In a separable flask, into an ethanol solution prepared beforehand by dissolving 4.6 g of titanium isopropoxide in 198.3 g of ethanol was dispersed 20 g of the powder $B_1$. Thereafter, a solution prepared beforehand by mixing 6.3 g of pure water with 47.9 g of ethanol was added dropwise to the dispersion under stirring over 1 hour. After the addition, the resulting mixture was reacted at ordinary temperature for 4 hours. After the reaction, washing with a sufficient amount of ethanol, filtration and drying in a vacuum drier at 110° C. for 3 hours were conducted. After the drying, the product was further subjected to heat treatment using a rotary tubular oven at 650° C. for 30 minutes in a nitrogen atmosphere and then cooled to obtain a silica-titania coated iron powder $B_2$. The resulting powder $B_2$ had satisfactory dispersibility and was composed of independent particles. The titania film of the powder $B_2$ had a thickness of 65 nm.

The powder $B_2$ had a spectral reflection curve having a peak wavelength of 573 nm and had a reflectance at the peak wavelength of 35%. It showed a vivid green color.

Furthermore, the powder $B_2$ had a magnetization of 168 emu/g at 10 kOe.

Third Layer, Silica Coating:

Into an ethanol solution prepared beforehand by dissolving 3.9 g of silicon ethoxide in 158.6 g of ethanol was dispersed 20 g of the powder $B_2$. Thereafter, a mixed solution of 8.0 g of ammonia water (29%) and 8.0 g of deionized water was added to the dispersion under stirring. After the addition, the resulting mixture was reacted at ordinary temperature for 5 hours. After the reaction, washing under dilution with a sufficient amount of ethanol, filtration and drying in a vacuum drier at 110° C. for 3 hours were conducted. After the drying, the product was subjected to heat treatment using a rotary tubular oven at 800° C. for 30 minutes in a nitrogen atmosphere and then cooled to obtain a silica-titania-silica coated iron powder $B_3$.

Fourth Layer, Titania Coating:

In a separable flask, into an ethanol solution prepared beforehand by dissolving 4.6 g of titanium isopropoxide in 198.3 g of ethanol was dispersed 20 g of the powder $B_3$. Thereafter, a solution prepared beforehand by mixing 6.0 g of pure water with 47.9 g of ethanol was added dropwise to the dispersion under stirring over 1 hour.

After the addition, the resulting mixture was reacted at ordinary temperature for 4 hours. After the reaction, washing under dilution with a sufficient amount of ethanol, filtration and drying in a vacuum drier at 110° C. for 3 hours were conducted. After the drying, the product was further subjected to heat treatment using a rotary tubular oven at 650° C. for 30 minutes in a nitrogen atmosphere and then cooled to obtain a silica-titania-silica-titania coated iron powder $B_4$. The resulting powder $B_4$ had satisfactory dispersibility and was composed of independent particles. The titania film of the fourth layer of the powder $B_4$ had a thickness of 69 nm.

The powder $B_4$ had a spectral reflection curve having a peak wavelength of 567 nm and had a reflectance at the peak wavelength of 46%. It showed vivid yellow-green color.

Furthermore, the powder $B_4$ had a magnetization of 126 emu/g at 10 kOe.

Treatment for Making the Powder Hydrophobic:

Into an ethanol solution prepared beforehand by dissolving 0.5 g of silicon ethoxide in 158.6 g of ethanol was dispersed 20 g of the powder $B_4$. Thereafter, a mixed solution of 3.0 g of ammonia water(29%) and 3.0 g of deionized water was added to the dispersion under stirring. After the addition, the resulting mixture was reacted at ordinary temperature for 1 hour. After the reaction, washing under dilution with a sufficient amount of ethanol, filtration and drying in a vacuum drier at 110° C. for 3 hours were conducted. After the drying, the product was cooled to obtain a silica-titania-silica-titania coated iron powder $B_5$ which was made hydrophobic.

Preparation of Fluorescent Pigment Composition, Mixing and Dispersing Fluorescent Material:

Into a cyclohexane solution prepared beforehand by dissolving 80 g of a styrene polymer and 5 g of an acrylic polymer (Trademark: Technovit, manufactured by Kulzer Co.) in 80 g of cyclohexane was dispersed 30 g of the resulting powder $B_5$. Thereafter, 10 g of particles of Rhodamine B (a fluorescent substance), 20 g of titanium oxide (a hydrophobicity-enhanced product: color-spreader), and 3.2 g of hydroxypropyl cellulose were added thereto and the mixture was subjected to dispersing treatment in a zirconia ball mill for 8 hours to obtain a coating material dispersion $BL_1$ of a fluorescent pigment composition.

Making Powder and Spectral Characteristics:

The above coating material dispersion $BL_1$ of the fluorescent pigment composition was spray-dried at 90° C. in a nitrogen gas atmosphere to obtain a sphere powder, fluorescent pigment composition $BP_1$. The sphere powder, fluorescent pigment composition $BP_1$ had a reflection peak at 586 nm in the visible light region, and the reflectance is 63%. It showed a bright yellow color.

In addition, when the sphere powder, fluorescent pigment composition $BP_1$ was packed into a quartz glass holder and irradiated with an ultraviolet lamp in a dark place, it emitted a pale orange fluorescence.

Furthermore, the sphere powder, fluorescent pigment composition $BP_1$ had a magnetization of 63 emu/g at 10 koe.

EXAMPLE 3

Embodiment in Which a Magnetic Material was Coated With a Multilayered Film and a Luminous Material was Mixed and Dispersed to Form a Coating Material Preparation of Luminous Pigment Composition, Mixing and Dispersing Luminous Material:

Into an ethanol solution prepared beforehand by dissolving 2.5 g of an acrylic polymer (Trademark: Technovit, manufactured by Kulzer Co.) in 80 g of ethanol was dispersed 30 g of the hydrophobicity-enhanced silica-titania-silica-titania iron powder $A_5$ obtained in Example 1. Thereafter, 18 g of fine particles of Eu, Dy-containing $SrAl_2O_4$ (a luminous substance), 20 g of titanium oxide (a hydrophobicity-enhanced product treated with silicon: color-spreader), and 3.2 g of hydroxypropyl cellulose were added thereto and the mixture was subjected to dispersing treatment in a zirconia ball mill for 8 hours to obtain a coating material dispersion $AL_2$ of a luminous pigment composition.

Making Powder and Spectral Characteristics:

The above coating material dispersion $AL_2$ of the luminous pigment composition was applied to an art paper with a blade coater. The applied amount (after drying) of the luminous pigment composition was 50 g/m².

Figure 3:
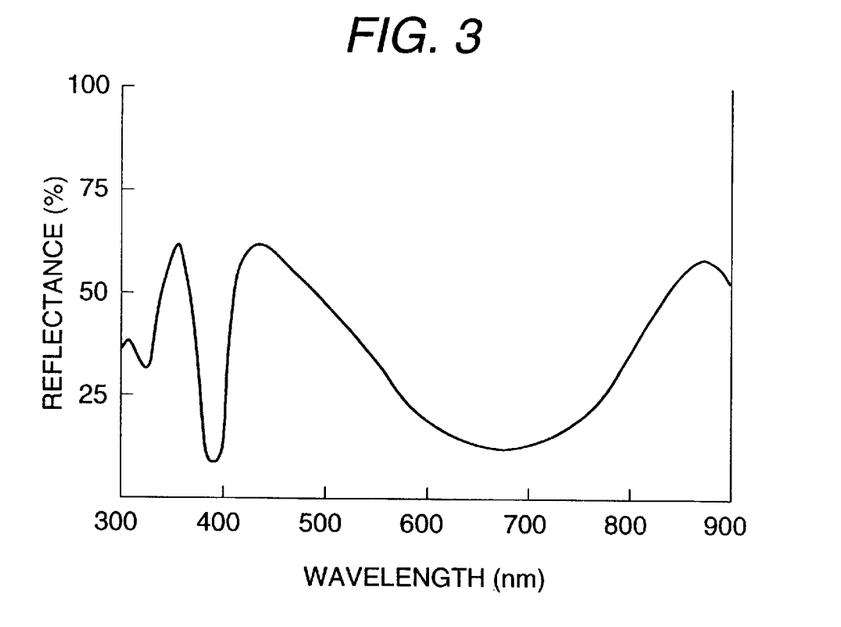
FIG. 3 is a graph showing a spectral reflectance curve of the luminous pigment composition obtained in Example 3.

The spectral reflectance curve of the applied paper 3 obtained after drying is shown in FIG. 3. Furthermore, the color of the applied paper 3 had a peak wavelength of 433 nm and was vivid cyan with a reflectance of 65%.

Figure 4:
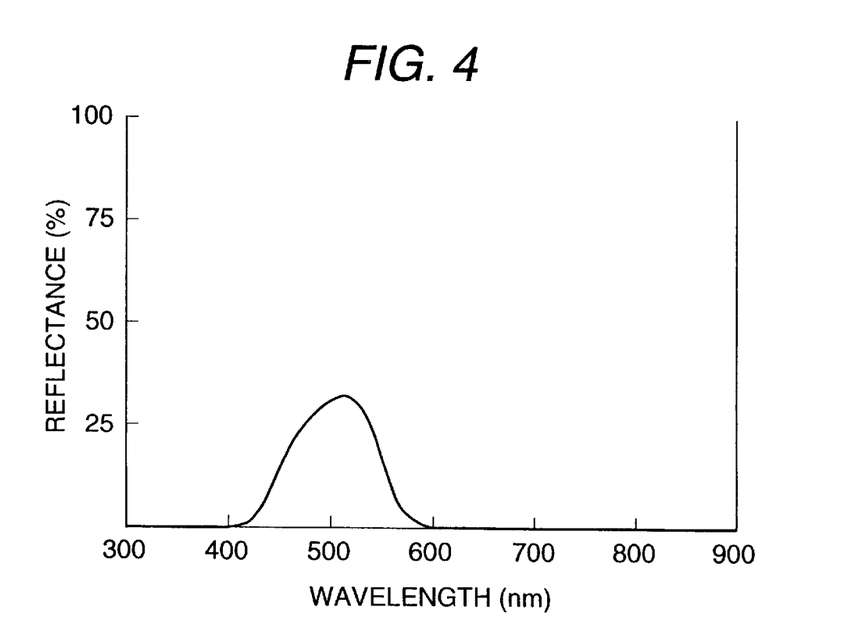
FIG. 4 is a graph showing a luminous spectral reflectance curve of the luminous pigment composition obtained in Example 3.

Moreover, the applied paper reflected a light of around 365 nm in the ultraviolet region with a reflectance of 67%, and also reflected a light of around 870 nm in the infrared region with a reflectance of 56%. Thus, the recognition and discrimination of both the lights permit the genuine/counterfeit discrimination with four types, i.e., magnetism, and visible light color, ultraviolet light, and infrared light. In addition, after the applied paper 3 was irradiated with an ultraviolet lamp for 1 hour, it emitted a pale yellow-green luminescence when the applied paper 3 was observed in a dark place. The emission strength of the applied paper 3 was determined after the light source of a spectrophotometer with integrating sphere (V-570 manufactured by JASCO Corporation), and a waveform shown in FIG. 4 was observed. Its color was blue-green.

Furthermore, the applied paper 3 had a magnetization of 2250 emu/m² at 10 koe.

COMPARATIVE EXAMPLE 2

Embodiment in Which a Magnetic Material was Coated with a Multilayered Film and a Luminous Material was not Mixed The same operations as in Example 3 were carried out. However, fine particles of a luminous substance, copper-containing cadmium zinc sulfide were not mixed to the dispersion at the preparation of the luminous pigment composition.

The applied paper had a reflection peak at 433 nm in the visible light region, at which the reflectance was 65%. The emission of luminescence was not observed even when the applied paper 4 was irradiated with an ultraviolet lamp in a dark place.

EXAMPLE 4

Embodiment in Which a Magnetic Material was Coated With a Multilayered Film, a Luminous Material was Mixed and Dispersed and the Materials Were Powdered by Spray Drying Preparation of Luminous Pigment Composition, Mixing and Dispersing Luminous Material:

Into a cyclohexane solution prepared beforehand by dissolving 30 g of a styrene polymer and 5 g of an acrylic polymer (Trademark: Technovit, manufactured by Kulzer Co.) in 80 g of cyclohexane was dispersed 30 g of the hydrophobicity-enhanced silica-titania-silica-titania iron powder $B_5$ obtained in Example 2. Thereafter, 12 g of fine particles of Eu, Dy-containing $SrAl_2O_4$ (a luminous substance), 20 g of titanium oxide (a hydrophobicity-enhanced product: color-spreader), and 3.2 g of hydroxypropyl cellulose were added thereto and the mixture was subjected to dispersing treatment in a zirconia ball mill for 8 hours to obtain a coating material dispersion $BL_2$ of a luminous pigment composition.

Making Powder and Spectral Characteristics:

The above coating material dispersion $BL_2$ of the luminous pigment composition was spray-dried at 90° C. in a nitrogen gas atmosphere to obtain a sphere powder, luminous pigment composition $BP_2$. The sphere powder, luminous pigment composition $BP_2$ had a reflection peak at 438 nm in the visible light region, and the reflectance is 64%. It showed a bright cyan color.

When the sphere powder, luminous pigment composition $BP_2$ was packed into a quartz glass holder and irradiated with an ultraviolet lamp for 1 hour and the emission strength was determined after the light source of a spectrophotometer with integrating sphere (V-570 manufactured by JASCO Corporation), an about 20% emission at around 520 nm was observed. And its color was blue-green.

Furthermore, the sphere powder, luminous pigment composition $BP_2$ had a magnetization of 59 emu/g at 10 kOe.

EXAMPLE 5

Fluorescent Multilayered Film-coated Powder

Embodiment in Which a Fluorescent Material was Contained in the Titania Coating of the Second Layer First layer, Silica coating:

Into 100 ml of ethanol was dispersed 10 g of a carbonyl iron powder (average particle size, 1.8 μm; magnetization at 10 kOe, 203 emu/g) manufactured by BASF and the temperature of the liquid was maintained at 55° C. by heating the vessel with oil bath. Thereto were added 6 g of silicon ethoxide, 8.0 g of ammonia water (29%) and 8.0 g of water. The mixture was reacted for 2 hours under stirring. After the reaction, washing under dilution with a sufficient amount of ethanol, filtration and drying in a vacuum drier at 110° C. for 3 hours were conducted. After the drying, the product was subjected to heat treatment using a rotary tubular oven at 650° C. for 30 minutes to obtain a silica coated iron powder $C_1$. The thickness of the resulting silica coated film was 98 nm, and the dispersion state was very satisfactory.

Second Layer, Titania Coating:

After the heating, 10 g of the resulting powder $C_1$ and 8 g of fine particles of copper-containing cadmium zinc sulfide which is a fluorescent substance (average particle size 0.01 μn) were again dispersed into 200 ml of ethanol. The vessel was heated with an oil bath to maintain the temperature of the liquid at 55° C. Thereto was added 4.7 g of titanium ethoxide, followed by stirring. A mixed solution of 30 ml of ethanol and 8.0 g of water was added dropwise thereto over 60 minutes, and the resulting mixture was reacted for 2 hours. The product was then vacuum-dried and subjected to heat treatment to obtain a silica-titania coated powder $C_2$. The resulting powder $C_2$ had satisfactory dispersibility and was composed of independent particles. The titania film of the powder $C_2$ had a thickness of 77 nm.

The powder $C_2$ had a spectral reflection curve having a peak wavelength of 450 nm and had a reflectance at the peak wavelength of 35%. It showed vivid cyan color.

Furthermore, the powder $C_2$ had a magnetization of 167 emu/g at 10 kOe.

Third Layer, Silica coating:

Into 100 ml of ethanol was dispersed 10 g of the powder $C_2$. The vessel was heated with an oil bath to maintain the temperature of the liquid at 55° C. Thereto were added 6 g of silicon ethoxide, 8 g of ammonia water (29%), and 8 g of water. The mixture was reacted for 2 hours under stirring. After the reaction, washing under dilution with a sufficient amount of ethanol, filtration and drying in a vacuum drier at 110° C. for 3 hours were conducted. After the drying, the product was subjected to heat treatment using a rotary tubular oven at 650° C. for 30 minutes to obtain a silica-titania-silica coated powder $C_3$. The film thickness of the third silica layer of the resulting powder $C_3$ was 99 nm, and the dispersion state was very satisfactory.

Fourth Layer, Titania Coating:

After the heating, 10 g of the resulting powder $C_3$ was again dispersed into 200 ml of ethanol. The vessel was heated with an oil bath to maintain the temperature of the liquid at 55° C. Thereto was added 5.3 g of titanium ethoxide, followed by stirring. A mixed solution of 30 ml of ethanol and 8.0 g of water was added dropwise thereto over 60 minutes, and the mixture was reacted for 2 hours. The powder was then vacuum-dried and heated to obtain a silica-titania-silica-titania coated powder $C_4$. The resulting powder $C_4$ had satisfactory dispersibility and was composed of independent particles. The titania film of the fourth layer of the powder $C_4$ had a thickness of 75 nm.

The powder $C_4$ had a reflection peak at 553 nm and a reflectance of 47%. It showed vivid green color.

The powder $C_4$ had a magnetization of 146 emu/g at 10 kOe.

Preparation of a Color ink Composition and Spectral Characteristics:

The resulting powder $C_4$ was mixed in an amount of 65 parts with 35 parts of a polyester resin varnish. The resulting composition was applied to a white paper with a blade coater.

The applied paper had a reflection peak at 553 nm in the visible light region with a reflectance of 53%. When the paper was irradiated with a fluorescent lamp, yellow fluorescence was emitted.

COMPARATIVE EXAMPLE 3

Multilayered Film-coated Powder Using a Magnetic Material: Embodiment in Which a Fluorescent Material was not Contained The same operations as in Example 5 were carried out. However, fine particles of fluorescent copper-containing cadmium zinc sulfide were not dispersed and mixed into the reaction mixture at the titania coating of the second layer.

The applied paper had a reflection peak at 553 nm in the visible light region, at which the reflectance was 53%. The emission of fluorescence was not observed even when the paper was irradiated with a fluorescent lamp.

EXAMPLE 6

Resin-containing dry Powdery Fluorescent Pigment Composition

Embodiment for Toner, etc

A 100 g portion of dry powder of the silica-titania-silica-titania coated iron powder $C_4$ was surface-treated with a silane coupling agent, and then, 40 g of rutile-type titanium oxide (a surface-treated product with silane coupling agent, average particle size 0.2 $\mu$m) and 110 g of styrene monomer were mixed thereto to form a homogeneous mixture. The mixture maintained at 70° C. beforehand was added to a solution obtained by dissolving 25 g of sodium n-dodecyl sulfate in distilled water, and the resulting mixture was emulsified with a high speed stirrer. Then, 10 g of 10% ammonium persulfate aqueous solution was added thereto and the mixture was reacted for 4 hours under slow stirring.

After the completion of the reaction, the mixture was diluted with 2 liters of distilled water, decantation and washing were repeated with adding distilled water for removing salts, and then filtered. The resulting cake was dried at 30° C. for 8 hours in a vacuum dryer to obtain a dry powder D.

The powder D was composed of spherical particles having a particle size of about 10 $\mu$n, showed bright green color, and had reflection peak at 555 nm with reflectance of 53%.

The powder D had a magnetization of 58 emu/g at 10 kOe. When the powder D was packed in a glass holder and irradiated with an ultraviolet lamp in a dark place, pale yellow light was emitted.

EXAMPLE 7

Multilayered Film-coated Powder Using a Magnetic Material

Embodiment in Which a Fluorescent Material was Impregnated

First layer, Silica Coating

Into an ethanol solution prepared beforehand by dissolving 3.0 g of silicon ethoxide in 158.6 g of ethanol was dispersed 20 g of a carbonyl iron powder (average particle size, 1.8 $\mu$m; magnetization at 10 kOe, 203 emu/g) manufactured by BASF. Thereafter, a mixed solution of 8.0 g of ammonia water(29%) and 8.0 g of deionized water was added thereto under stirring. After the addition, the resulting mixture was reacted at ordinary temperature for 5 hours, and then washed with a sufficient amount of ethanol. After vacuum drying, the product was further subjected to heat treatment using a rotary tubular oven at 500° C. for 30 minutes in a nitrogen atmosphere to obtain a silica coated powder $E_1$.

Second Layer, Titania Coating

Into an ethanol solution prepared beforehand by dissolving 3.0 g of titanium ethoxide in 198.3 g of ethanol was dispersed 20 g of the powder $E_1$. Thereafter, a mixed solution of 3.0 g of deionized water and 23.7 g of ethanol was added dropwise thereto under stirring over 1 hour. After the addition, the resulting mixture was reacted at ordinary temperature for 5 hours, and then washed with a sufficient amount of ethanol. After vacuum drying, the product was further subjected to heat treatment using a rotary tubular oven at 500° C. for 30 minutes in a nitrogen atmosphere to obtain a silica-titania coated carbonyl iron powder $E_2$.

Third Layer, Silica Coating:

Into an ethanol solution prepared beforehand by dissolving 3.0 g of silicon ethoxide in 158.6 g of ethanol was dispersed 20 g of the powder $E_2$. Thereafter, a mixed solution of 8.0 g of ammonia water (29%) and 8.0 g of deionized water was added thereto under stirring. After the addition, the resulting mixture was reacted at ordinary temperature for 5 hours, and then washed with a sufficient amount of ethanol. After vacuum drying, the product was further subjected to heat treatment using a rotary tubular oven at 500° C. for 30 minutes in a nitrogen atmosphere to obtain a silica-titania-silica coated iron powder $E_3$.

Fourth Layer, Titania Coating:

Into an ethanol solution prepared beforehand by dissolving 3.0 g of titanium ethoxide in 198.3 g of ethanol was dispersed 20 g of the powder $E_3$. Thereafter, a mixed solution of 3.0 g of deionized water and 23.7 g of ethanol was added dropwise thereto under stirring over 1 hour. After the addition, the resulting mixture was reacted at ordinary temperature for 5 hours, and then washed with a sufficient amount of ethanol. After vacuum drying, the product was further subjected to heat treatment using a rotary tubular oven at 500° C. for 30 minutes in a nitrogen atmosphere to obtain a silica-titania-silica-titania coated iron powder $E_4$.

Fifth Layer, Silica Coating:

Into an ethanol solution prepared beforehand by dissolving 3.0 g of silicon ethoxide in 158.6 g of ethanol was dispersed 20 g of the powder $E_4$. Thereafter, a mixed solution of 8.0 g of ammonia water (29%) and 8.0 g of deionized water was added thereto under stirring. After the addition, the resulting mixture was reacted at ordinary temperature for 5 hours, and then washed with a sufficient amount of ethanol. After vacuum drying, the product was further subjected to heat treatment using a rotary tubular oven at 500° C. for 30 minutes in a nitrogen atmosphere to obtain a silica-titania-silica-titania-silica coated iron powder $E_5$.

Sixth Layer, Titania Coating:

Into an ethanol solution prepared beforehand by dissolving 3.0 g of titanium ethoxide in 198.3 g of ethanol was dispersed 20 g of the powder $E_5$. Thereafter, a mixed solution of 3.0 g of deionized water and 23.7 g of ethanol was added dropwise thereto under stirring over 1 hour. After the addition, the resulting mixture was reacted at ordinary temperature for 5 hours, and then washed with a sufficient amount of ethanol. After vacuum drying, the product was further subjected to heat treatment using a rotary tubular oven at 500° C. for 30 minutes in a nitrogen atmosphere to obtain a silica-titania-silica-titania-silica-titania coated iron powder $E_6$.

The resulting powder $E_6$ was immersed in a solution of a concentration of 0.5 g/100 g obtained by dissolving International Orange, which is a fluorescent substance, in ethyl acetate. After separation from the mixture, the solid mass was vacuum-dried to obtain a fluorescent material-impregnated silica-titania-silica-titania-silica-titania coated iron powder $E_7$.

Preparation of a Color ink Composition and Spectral Characteristics:

With 10 g of a polyester resin varnish were mixed 2 g of the powder $E_7$ and further 7 g of xylene as solvent to form an ink. An A4 size art paper was uniformly coated with 5 g of the ink by means of a blade coater, and dried.

Figure 5:
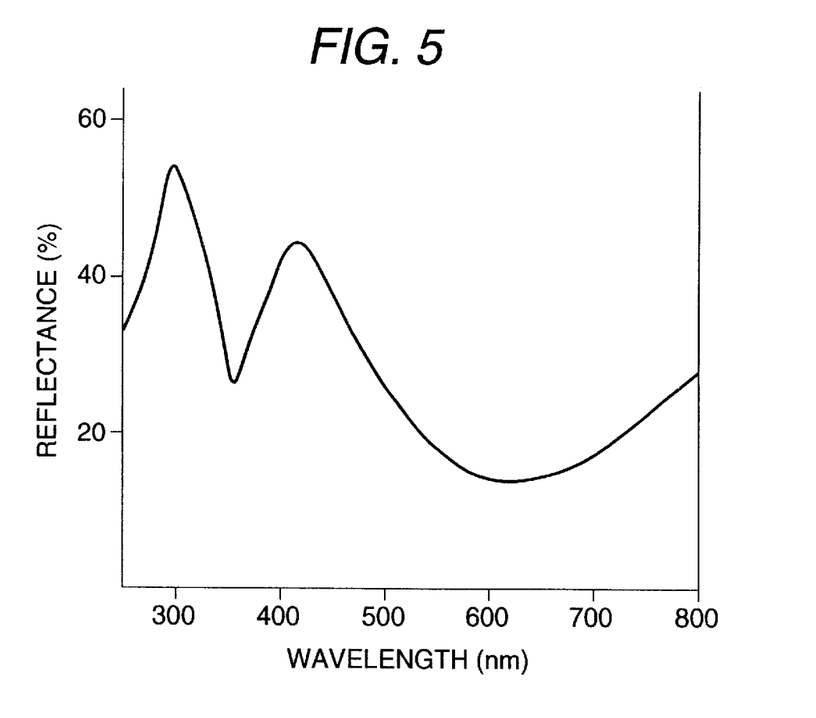
FIG. 5 is a graph showing a spectral reflectance curve of the fluorescent pigment composition obtained in Example 7.

The spectral reflectance curve of the coated paper 5 obtained after drying is shown in FIG. 5. Furthermore, the color of the coated paper 5 had a peak wavelength of 460 nm and was vivid greenish blue having a reflectance of 43%.

Figure 6:
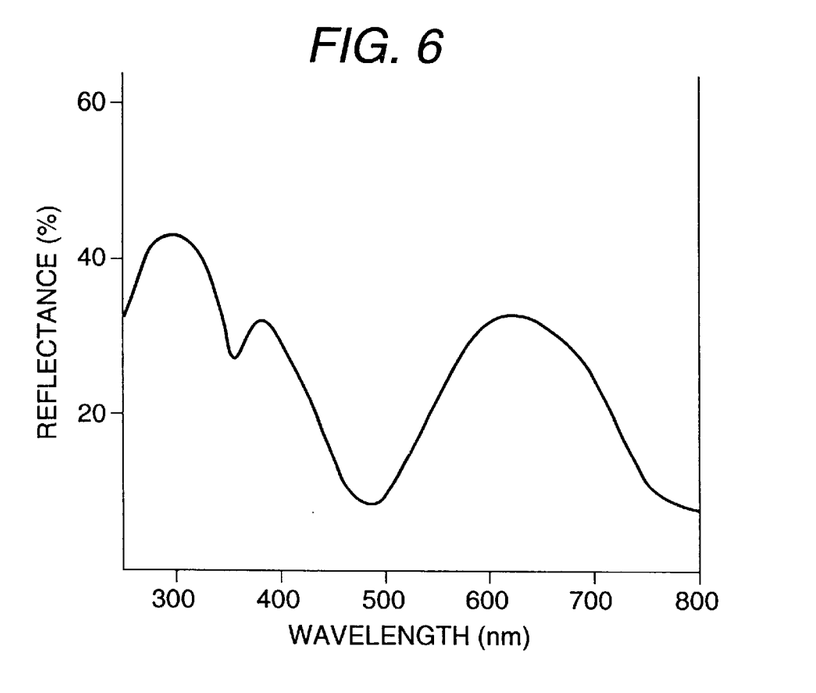
FIG. 6 is a graph showing a fluorescent spectral reflectance curve of the fluorescent pigment composition obtained in Example 7.

Moreover, the coated paper reflected a light of around 315 nm in the ultraviolet region with a reflectance of 55%, and also reflected a light of around 1115 nm in the infrared region with a reflectance of 60%. Thus, the recognition and discrimination of both the lights permit the genuine/counterfeit discrimination with four types, i.e., magnetism, and a visible light color, ultraviolet light, and infrared light. In addition, when the coated paper was irradiated with a fluorescent lamp in a dark place, it emitted a pale orange light (FIG. 6).

EXAMPLE 8

Multilayered Film-coated Powder Using a Magnetic Material

Embodiment in Which a Layer of a Fluorescent Material Alone was Coated

First Layer, Silica Coating:

Into an ethanol solution prepared beforehand by dissolving 3.5 g of silicon ethoxide in 158. 6 g of ethanol was dispersed 20 g of a carbonyl iron powder (average particle size, 1.8 µm; magnetization at 10 kOe, 203 emu/g) manufactured by BASF. Thereafter, a mixed solution of 8.0 g of ammonia water (29%) and 8.0 g of deionized water was added thereto under stirring. After the addition, the resulting mixture was reacted at ordinary temperature for 5 hours, and then washed with a sufficient amount of ethanol. After vacuum drying, the product was further subjected to heat treatment using a rotary tubular oven at 800° C. for 30 minutes in a nitrogen atmosphere and cooled to obtain a silica coated iron powder $F_1$.

Second Layer, Zinc Sulfide Coating:

In a separable flask, into an ethanol solution prepared beforehand by dissolving 5.6 g of zinc ethoxide in 198.3 g of ethanol was dispersed 20 g of the powder $F_1$. Thereafter, hydrogen sulfide gas was bubbled therein at a rate of 100 ml/minute and further 55.9 g of 3% cuprous sulfate ethanol solution was added dropwise thereto under stirring over 1 hour. After the addition, the resulting mixture was reacted at ordinary temperature for 4 hours, and then washed with a sufficient amount of ethanol. After vacuum drying, the product was further subjected to heat treatment using a rotary tubular oven at 800° C. for 30 minutes in a nitrogen atmosphere and cooled to obtain a silica-zinc sulfide coated iron powder $F_2$. The thickness of zinc sulfide was 55 nm, and the powder $F_2$ had reflection peak at 420 nm and showed blue color with reflectance of 30%. When the powder $F_2$ was irradiated with a fluorescent light, a green fluorescent color was observed.

Third Layer, Silica Coating:

Into an ethanol solution prepared beforehand by dissolving 3.5 g of silicon ethoxide in 158.6 g of ethanol was dispersed 20 g of the powder $F_2$. Thereafter, a mixed solution of 8.0 g of ammonia water (29%) and 8.0 g of deionized water was added thereto under stirring. After the addition, the resulting mixture was reacted at ordinary temperature for 5 hours, and then washed with a sufficient amount of ethanol. After vacuum drying, the product was further subjected to heat treatment using a rotary tubular oven at 800° C. for 30 minutes in a nitrogen atmosphere and cooled to obtain a silica-zinc sulfide-silica coated iron powder $F_3$.

Fourth Layer, Zinc Sulfide Coating:

In a separable flask, into an ethanol solution prepared beforehand by dissolving 5.6 g of zinc ethoxide in 198.3 g of ethanol was dispersed 20 g of the powder $F_3$. Thereafter, hydrogen sulfide gas was bubbled therein at a rate of 100 ml/minute and further 55.9 g of 3% cuprous sulfate ethanol solution was added dropwise thereto under is stirring over 1 hour. After the addition, the resulting mixture was reacted at ordinary temperature for 4 hours, and then washed with a sufficient amount of ethanol. After vacuum drying, the product was further subjected to heat treatment using a rotary tubular oven at 800° C. for 30 minutes in a nitrogen atmosphere and cooled to obtain a silica-zinc sulfide-silica-zinc sulfide coated iron powder $F_4$. The thickness of zinc sulfide of the fourth layer was 55 nm, and the powder $F_4$ had reflection peak at 385 nm and showed purple color with reflectance of 41%. When the powder $F_4$ was irradiated with a fluorescent light, a green fluorescent color was observed, which was lighter than the light of the second layer.

EXAMPLE 9

Luminous Multilayered Film-coated Powder

Embodiment in Which a Luminous Material was Contained in the Titania Coating of the Second Layer Coating of Each Layer Each layer was coated in a similar manner to Example 5 with the exception that 8 g of fine particles of the copper-containing cadmium zinc sulfide which is a fluorescent substance (average particle size 0.015 μm) used at the second layer was replaced by 8 g of fine particles of copper-containing cadmium zinc sulfide which is a luminous substance (average particle size 0.015 μn).

The film thickness of each layer, peak wavelength of spectral reflection curve, reflectance at peak wavelength, color, and magnetization at 10 kOe of the resulting luminous multilayered film-coated powder were the same as those of the fluorescent multilayered film-coated powder of Example 5.

Preparation of a Color ink Composition and Spectral Characteristics:

The resulting powder was mixed in an amount of 65 parts with 35 parts of a polyester resin varnish. The resulting liquid luminous pigment composition was applied to an A4-size art paper in an amount of 70 g/m² with a blade coater and then dried to obtain an applied paper 6 of the luminous pigment composition.

The applied paper 6 had a color of a peak wavelength of 553 nm, which was bright blue-green with a reflectance of 53%. In addition, after the applied paper 6 had been irradiated with an ultraviolet lamp for 1 hour, pale green luminescence was visually observed in a dark place.

The applied paper 6 of the luminous pigment composition had a magnetization of 6643 emu/m² at 10 koe.

COMPARATIVE EXAMPLE 4

Multilayered Film-coated Powder Using a Magnetic Material

Embodiment in Which a Luminous Material was not Contained

The same operations as in Example 9 were carried out. However, fine particles of the luminous copper-containing cadmium zinc sulfide were not mixed into the reaction mixture at the titania coating of the second layer.

The applied paper had a reflection peak at 553 nm, at which the reflectance was 53%. The emission of luminescence was not observed even when the paper was irradiated with a fluorescent lamp.

EXAMPLE 10

Resin-containing dry Powdery Luminous Pigment Composition; the Case for Toner, etc.

A 100 g portion of dry powder of the silica-titania-silica-titania coated iron powder $C_4$ obtained in Example 5 was surface-treated with a silane coupling agent, and then, 40 g of rutile-type titanium oxide (a surface-treated product with a silane coupling agent, average particle size 0.2 μm) and 110 g of styrene monomer were mixed thereto to form a homogeneous mixture. The mixture maintained at 70° C. beforehand was added to a solution obtained by dissolving 25 g of sodium n-dodecyl sulfate in distilled water, and the resulting mixture was emulsified with a high-speed stirrer. Then, 10 g of 10% ammonium persulfate aqueous solution was added thereto and the mixture was reacted for 4 hours under slow stirring.

After the completion of the reaction, the resulting mixture was diluted with 2 liters of distilled water, decantation and washing were repeated with adding distilled water for removing salts. After filtration, the resulting cake was dried at 30° C. for 8 hours in a vacuum dryer to obtain a dry powder G.

The powder G was composed of spherical particles having a particle size of about 10 μm, showed bright green color, and had a reflection peak at 555 nm with a reflectance of 53%.

The powder G had a magnetization of 52 emu/g at 10 koe. Furthermore, after the luminous pigment composition had been irradiated with an ultraviolet lamp for 1 hour, the applied paper 7 emitted pale green luminescence when it was observed in a dark place. When the powder G was packed in a glass holder and irradiated with an ultraviolet lamp in a dark place, pale green luminescence was observed.

EXAMPLE 11

Multilayered Film-coated Powder Using a Magnetic Material

Embodiment in Which a Luminous Material was Impregnated

The silica-titania-silica-titania-silica-titania coated iron powder $E_6$ obtained in Example 7 was immersed in an emulsion having a concentration of 5 g/100 g obtained by dispersing and emulsifying, in water, fine particles (0.01 μm) of copper-containing cadmium zinc sulfide which is a fluorescent substance. After separation from the mixture, the solid mass was vacuum-dried to obtain a luminous material-impregnated silica-titania-silica-titania-silica-titania-silica coated iron powder H.

Preparation of a Color ink Composition and Spectral Characteristics:

With 10 g of a polyester resin varnish were mixed 2 g of the powder H and further 7 g of xylene as solvent to form an ink. The ink having this composition was applied to an A4 size art paper uniformly in an amount of 68 g/m² by a blade coater, and dried.

Figure 7:
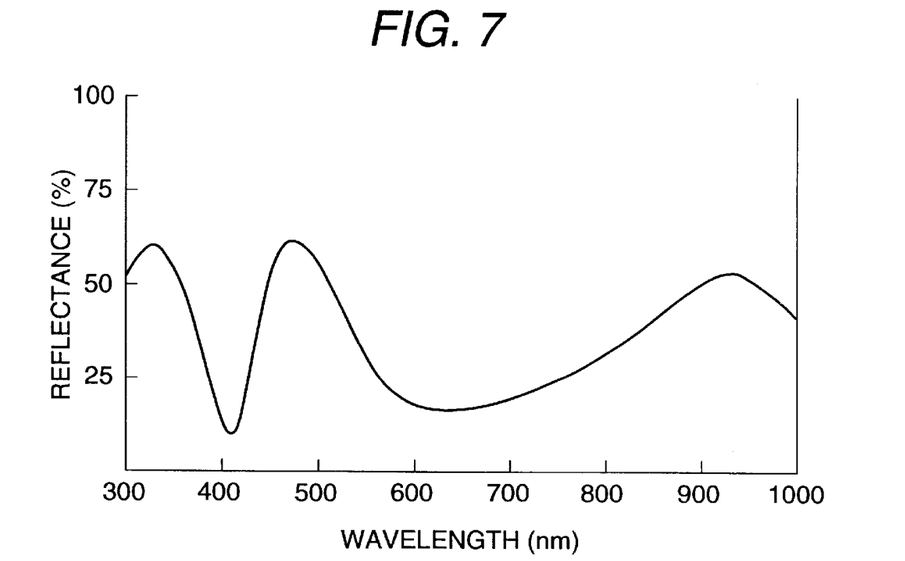
FIG. 7 is a graph showing a spectral reflectance curve of the luminous pigment composition obtained in Example 11.

The spectral reflectance curve of the applied paper 8 obtained after drying is shown in FIG. 7. Furthermore, the applied paper 8 had a peak wavelength of 460 nm and showed a vivid cyan color with a reflectance of 64%.

The luminous pigment composition-applied paper 8 had a magnetization of 2595 emu/m² at 10 kOe.

Moreover, the applied paper reflected a light of around 324 nm in the ultraviolet region with a reflectance of 55%, and also reflected a light of around 920 nm in the infrared region with a reflectance of 53%.

Figure 8:
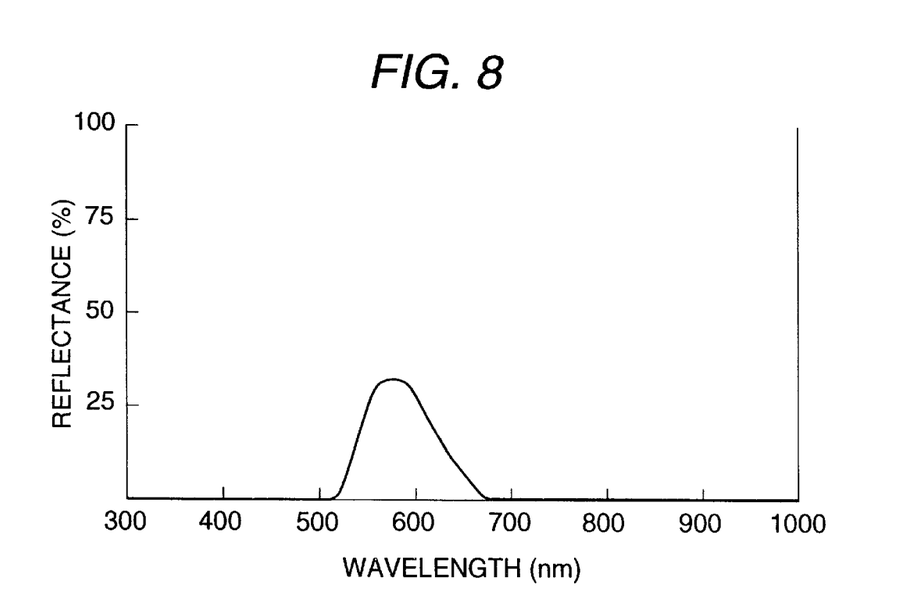
FIG. 8 is a graph showing a luminous spectral reflectance curve of the luminous pigment composition obtained in Example 11.

In addition, after the applied paper 8 was irradiated with an ultraviolet lamp for 1 hour, the applied paper 8 emitted a pale yellow-green luminescence when it was observed in a dark place. When the emission strength of the applied paper 8 was determined after the light source of a spectrophotometer with integrating sphere (V-570 manufactured by JASCO Corporation) had been turned off, a waveform shown in FIG. 8 was observed. And its color was blue-green.

The discrimination can be effected by six types, i.e., these reflection of ultraviolet light, reflection of infrared light, real color in the visible light region, luminescence in the dark, and magnetism, as well as the electric field responsibility of the base particle as an electric conductor.

EXAMPLE 12

Luminous Multilayered Film-coated Powder Using a Magnetic Material

Embodiment in Which a Layer of a Luminous Material, $SrAl_2O_4$:Eu Alone was Coated First Layer, Silica Coating:

A silica coated iron powder $I_1$ was obtained in a similar manner to Example 8.

Second Layer, Eu-containing Strontium Aluminate Coating:

In a separable flask, with an ethanol solution prepared beforehand by dissolving 5.8 g of aluminum ethoxide, 4.5 g of strontium ethoxide, and 0.8 g of europium ethoxide in 198.3 g of ethanol was mixed 20 g of the powder $I_1$ and the mixture was thoroughly homogenized. Thereafter, a solution prepared by mixing 5.3 g of distilled water in 55.9 g of ethanol was added dropwise thereto under stirring over 1 hour. After the addition, the resulting mixture was reacted at ordinary temperature for 6 hours, and then washed with a sufficient amount of ethanol. After vacuum drying, the product was further subjected to heat treatment using a rotary tubular oven at 1000° C. for 30 minutes in a nitrogen atmosphere and rapidly cooled to obtain a silica-Eu-containing strontium aluminate coated iron powder $I_2$. The thickness of the Eu-containing strontium aluminate film was 60 nm, and the powder $I_2$ had reflection peak at 500 nm and showed green color with reflectance of 28%. After the powder $I_2$ had been irradiated with a fluorescent light for 2 hours, a blue luminescence was emitted when the powder I1 was observed in a dark box.

Third Layer, Silica Coating:

Into an ethanol solution prepared beforehand by dissolving 4.0 g of silicon ethoxide in 158. 6 g of ethanol was dispersed 16 g of the powder $I_2$. Thereafter, a mixed solution of 8.5 g of ammonia water (29%) and 8.5 g of deionized water was added thereto under stirring. After the addition, the resulting mixture was reacted at ordinary temperature for 5 hours, and then washed with a sufficient amount of ethanol. After vacuum drying, the product was further subjected to heat treatment using a rotary tubular oven at 800° C. for 30 minutes in a nitrogen atmosphere and cooled to obtain a silica-Eu-containing strontium aluminate-silica coated iron powder $I_3$.

Fourth Layer, Eu-containing Strontium Aluminate Coating:

In a separable flask, with an ethanol solution prepared beforehand by dissolving 5.8 g of aluminum ethoxide, 4.5 g of strontium ethoxide, and 0.8 g of europium ethoxide in 198.3 g of ethanol was mixed 16 g of the powder $I_3$ and the mixture was thoroughly homogenized. Thereafter, a solution prepared by mixing 5.3 g of distilled water in 55.9 g of ethanol was added dropwise thereto under stirring over 1 hour. After the addition, the resulting mixture was reacted at ordinary temperature for 6 hours, and then washed with a sufficient amount of ethanol. After vacuum drying, the product was further subjected to heat treatment using a rotary tubular oven at 1000° C. for 30 minutes in a nitrogen atmosphere and rapidly cooled to obtain a silica-Eu-containing strontium aluminate-silica-Eu-containing strontium aluminate coated iron powder $I_4$.

The thickness of the Eu-containing strontium aluminate film of the fourth layer of the powder $I_4$ was 60 nm, and the powder $I_4$ had reflection peak at 480 nm and showed green color with reflectance of 38%. After the powder $I_4$ had been irradiated with a fluorescent light for 2 hours, a blue luminescence was observed when the powder was placed in a dark box, the luminescence being lighter than that of the above two-layer coated powder $I_2$.

INDUSTRIAL APPLICABILITY

As explained in the above, the fluorescent or luminous composition of the present invention has both of color and fluorescence or luminescence, and is usable as an ink, a filler, and a coating material for color printing or coating having a monochromatic beautiful and stable color tone, such as, blue, green, yellow, or the like. Furthermore, since it has an interference reflection peak outside the visible light region besides the visible light region, counterfeit prevention with high accuracy is possible through the detection of reflected light by (the irradiation with) ultraviolet light or infrared light and also through the discrimination of printed articles by (the detection of) the presence of fluorescence or luminescence which allows the genuine/counterfeit discrimination without using a special reading instrument.

Along with these excellent functions, when a magnetic material is used as the base material, the composition is also usable as a color material of the ink for high performance magnetic color printing, and has an extremely high practical use because of its capability of enhancing counterfeit-preventive effect of printed articles since it possesses combined discriminating functions with eight types, i.e., visible light, non-visible light (ultraviolet region and infrared region), luminescence and magnetism, electricity (change of electric field), electron beam and further X-ray.

What is claimed is:

1. A fluorescent or luminous composition, comprising a multilayer film-coated powder having at least two coating films on a base particle, said at least one layer of the coating films containing a fluorescent or luminous substance, and wherein said multilayer film shows a light interference action.

2. The fluorescent or luminous composition according to claim 1, wherein the multilayered film shows a specific interference reflection peak or interference transmission bottom in a region besides the visible light region.

3. The fluorescent or luminous composition according to claim 1, wherein the base particle is a magnetic particle.

4. The fluorescent or luminous composition according to claim 1, which further contains a coloring agent.

5. A genuine/counterfeit discrimination object, in which the fluorescent or luminous composition according to any one of claims 1 to 4 is adhered or contained.

6. A method for discriminating genuine articles from counterfeit articles, which comprises irradiating an article with light and judging that the article is genuine by observing fluorescence or luminescence of the irradiated article, wherein said genuine articles comprise a multilayer film-coated powder having at least two coating films on a base particle, said at least one layer of the coating films containing a fluorescent or luminous substance.

7. The method according to claim 6, wherein said base particle comprises a magnetic material, and said method further comprises judging that the article is genuine based on interaction of the article with a magnetic field.

8. The method according to claim 6, wherein said base particle comprises a dielectric or conductive material, and said method further comprises judging that the article is genuine based on interaction of the article with an electric field.

9. The method according to claim 6, wherein said base particle comprises a magnetic material, and said method further comprises judging that the article is genuine based on interaction of the article with an electron beam.

* * * * *